(12) United States Patent
Park

(10) Patent No.: US 10,884,488 B2
(45) Date of Patent: Jan. 5, 2021

(54) ELECTRONIC DEVICE AND METHOD FOR CONTROLLING DISPLAY

(71) Applicant: Samsung Electronics Co., Ltd., Gyeonggi-do (KR)

(72) Inventor: Jung-Hoon Park, Seoul (KR)

(73) Assignee: Samsung Electronics Co., Ltd (KR)

( * ) Notice: Subject to any disclaimer, the term of this patent is extended or adjusted under 35 U.S.C. 154(b) by 611 days.

(21) Appl. No.: 15/529,368

(22) PCT Filed: Nov. 23, 2015

(86) PCT No.: PCT/KR2015/012584
§ 371 (c)(1),
(2) Date: May 24, 2017

(87) PCT Pub. No.: WO2016/085212
PCT Pub. Date: Jun. 2, 2016

(65) Prior Publication Data
US 2018/0321739 A1    Nov. 8, 2018

(30) Foreign Application Priority Data

Nov. 24, 2014 (KR) .......................... 10-2014-0164406
Jan. 30, 2015 (KR) .......................... 10-2015-0015179

(51) Int. Cl.
*G06F 3/01* (2006.01)
*G06F 3/0481* (2013.01)
(Continued)

(52) U.S. Cl.
CPC ............ *G06F 3/013* (2013.01); *G06F 3/0482* (2013.01); *G06F 3/04817* (2013.01);
(Continued)

(58) Field of Classification Search
CPC .. G06F 3/013; G06F 3/04842; G06F 3/04817; G06F 3/0482; G06F 2203/04801; G06F 3/01; H04N 5/2354; H04N 5/2351
See application file for complete search history.

(56) References Cited

U.S. PATENT DOCUMENTS 8,205,165 B2    6/2012 Dai Lago
2003/0193657 A1*  10/2003 Uomori .................. G01B 11/25
                                                                    356/3.1
(Continued)

FOREIGN PATENT DOCUMENTS

JP         2012216180         11/2012
KR      1020100079831          7/2010
(Continued)

OTHER PUBLICATIONS

PCT/ISA/210 Search Report issued on PCT/KR2015/012584 (pp. 4).
(Continued)

*Primary Examiner* — Lunyi Lao
*Assistant Examiner* — Jarurat Suteerawongsa
(74) *Attorney, Agent, or Firm* — The Farrell Law Firm, P.C.

(57) ABSTRACT

The present invention relates to an electronic device and method for controlling a display by eye tracking. The method for controlling a display by eye tracking according to the present invention may comprise the steps of: tracking of line of sight of eyes; displaying, on a screen, a user interface for controlling the screen using the tracked line of sight; and executing a function selected in response to a selection of any menu item of the user interface by the tracked line of sight.

20 Claims, 29 Drawing Sheets

(51) Int. Cl.
  *G06F 3/0484* (2013.01)
  *H04N 5/232* (2006.01)
  *G06F 3/0482* (2013.01)
  *H04N 5/235* (2006.01)

(52) U.S. Cl.
  CPC ......... *G06F 3/04842* (2013.01); *H04N 5/232* (2013.01); *H04N 5/2351* (2013.01); *H04N 5/2354* (2013.01); *G06F 2203/04801* (2013.01)

(56) References Cited

U.S. PATENT DOCUMENTS

| | | |
|---|---|---|
| 2010/0013949 A1 | 1/2010 | Miyamoto |
| 2010/0165180 A1 | 7/2010 | Park et al. |
| 2013/0114850 A1* | 5/2013 | Publicover ......... G06K 9/00604 |
| | | 382/103 |
| 2013/0169530 A1 | 7/2013 | Bhaskar et al. |
| 2013/0257709 A1* | 10/2013 | Raffle .................... G06F 3/013 |
| | | 345/156 |
| 2013/0318457 A1 | 11/2013 | Bjorklund et al. |
| 2014/0078381 A1* | 3/2014 | Ovsiannikov ........ H04N 5/2354 |
| | | 348/370 |
| 2015/0062324 A1 | 3/2015 | Choi |
| 2015/0091793 A1 | 4/2015 | Lee et al. |
| 2015/0145777 A1* | 5/2015 | He ....................... G06K 9/0061 |
| | | 345/158 |

FOREIGN PATENT DOCUMENTS

| | | |
|---|---|---|
| KR | 1020120115630 | 10/2012 |
| KR | 1020130102918 | 9/2013 |
| KR | 1020140055987 | 5/2014 |
| WO | WO 2013/154273 | 10/2013 |

OTHER PUBLICATIONS

Hansen, John Paulin et al., Gaze Typing Compared with Input by Head and Hand, Copyright 2004 by the Association for Computing Machinery, Inc., pp. 131-138.

* cited by examiner

ENVIRONMENT CONDITION OF EYE LOCATION INFORMATION SETTINGS

Step 1. DISTANCE BETWEEN MONITOR AND EYE

CHECK SIZE AND LOCATION OF EYE MATCHING FOCUS OF EYE IN CAMERA VIEW SCREEN ACCORDING TO DISTANCE CONDITION BETWEEN MONITOR AND EYE AND START EYE LOCATION GUIDE

ENVIRONMENT CONDITION (RECOMMENDED)
MONITOR SIZE          19"        (inches, up to 24")
MONITOR RESOLUTION    1440 x 900 (up to 1920 x 1080)
DISTANCE FROM EYE     55 cm      (± 5 cm, up to 60 cm)

Step 2. EYE LOCATION INFORMATION SETTING SPEED (TIME)

SELECT ONE OF 5 LEVELS, FROM SLOW TO FAST ACCORDING TO TIME TAKEN, FOR MEASUREMENT SPEED OF SETTING PROCESS

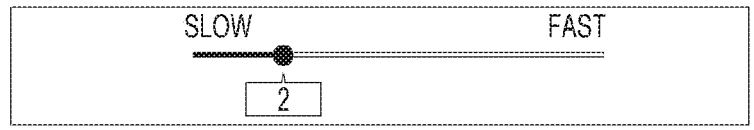

Step 2. EXECUTE EYE LOCATION INFORMATION SETTINGS
EXECUTABLE WHEN "EYE LOCATION INFORMATION SETTING EXECUTION" BUTTON IS GREEN
IF NOT GREEN, REPEAT STEP 1, AND WHEN UNRESOLVED,
"SETTINGS > CAMERA SETTINGS" IS NECESSARY

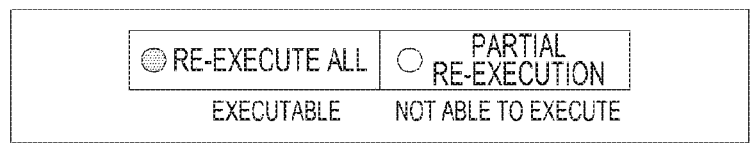

ELECTRONIC DEVICE AND METHOD FOR CONTROLLING DISPLAY

PRIORITY

This application is a National Phase Entry of International Application No. PCT/KR2015/012584, which was filed on Nov. 23, 2015, and claims priority to Korean Patent Applications No. 10-2014-0164406 and 10-2015-0015179, which were filed on Nov. 24, 2014 and Jan. 30, 2015, respectively, the contents of each of which are incorporated herein by reference.

TECHNICAL FIELD

The present invention relates an electronic device and a method for controlling a display by tracking the point of gaze.

BACKGROUND ART

In general, when tasks are performed through a computer, a command input into the computer may be made through a mouse or a keyboard. A normal user controls the mouse or the keyboard by using his/her fingers to perform a desired task. As described above, when a function that the user desires is executed through the mouse or the keyboard, an execution result is displayed through a screen. However, patient's with muscle disease or Lou Gehrig's disease having a lower screen control ability compared to a normal user have many restrictions in using the mouse or the keyboard, thereby feeling difficulty in using the computer. At this time, an input system using the point of a user's gaze may be used as one of input devices and, in this case, a system for controlling the computer by tracking the point of a user's eye gaze may be constructed and the need to use the system may be brought up.

In general, a method of sensing an image includes a Charge Coupled Device (CCD) and a Complementary Metal Oxide Semiconductor (CMOS), and a video clip may successively have several still image frames such as 30 frames or 60 frames per 1 second. At this time, the still frames may be partitioned through a vertical synchronizer signal, and a plurality of one-dimensional register scan horizontal images and other mixed images may be combined in one two-dimensional still image. Such line images may be sequentially connected one by one to construct temporally connected successive image signals and a set of the signals may be also transitioned into successive analog signals. When one image is made through gathering of the lines, vertical synchronizer signals may be used to partition the image signals.

Accordingly, in order to smoothly and conveniently use a computer through the point of a user's eye gaze instead of a user's finger or voice, it is required to more accurately track the point of eye gaze through emission of light sources by regular light source switching based on timing synchronization of a horizontal synchronization signal within a vertical synchronization signal.

Further, it is required to smoothly use the computer through the point of the user's eye gaze instead of the user's finger.

DETAILED DESCRIPTION OF THE INVENTION

Technical Problem

The conventional system has disadvantages in that, when light of a relatively greatly bright light source is used in a dark place or a slightly dark light source is used in a bright place, variables of a time for which the light source is turned on to capture an image and a time for which the light source is turned off may significantly influence a total exposure amount of each of the light sources. In this case, saturation may occur in an image sensor when the light source is much brighter than the surroundings and, on the contrary to this, the image cannot be acquired when the light source is much darker than the surroundings. In other words, a brightness strength of each light source should have minimum brightness to acquire a desired image and should not exceed a maximum brightness that may damage the eye. That is, it is required to adaptively control the desired image through a proper exposure time of the light source according to ambient brightness. The conventional system processes an image in a state where it has not been determined whether the light source is proper or not, and thus cannot acquire a desired result through the image processing, thereby increasing an amount of calculations of the system and also not acquiring a clear image.

Further, the conventional system does not provide an interface that gives instructions to an electronic device based on the point of a user's eye gaze.

Technical Solution

Accordingly, various embodiments of the present invention provide an electronic device and a method for capturing an image to track the point of gaze.

Further, various embodiments of the present invention provides an electronic device and a method for controlling a display by tracking the point of gaze.

In accordance with an embodiment to achieve the technical solution, a method of capturing an image by an electronic device is provided. The method includes: measuring ambient brightness; making a light source emit light by controlling at least one of a brightness strength of the light source and an exposure time of the light source in order to capture an image according to the measured ambient brightness; generating a plurality of frames corresponding to the capturing of the image through the emitted light source; and selecting at least one frame from the plurality of generated frames.

In accordance with an embodiment to achieve the technical solution, an electronic device for capturing an image is provided. The electronic device includes: a light emitting unit including at least one light emitting element that makes a light source emit light; a camera unit that captures an image through the emitted light source; a detection unit that measures ambient brightness to capture the image; and a controller that makes the light source emit light by controlling at least one of a brightness strength of the light source and an exposure time of the light source to capture the image according to the measured ambient brightness, generates a plurality of frames corresponding to the capturing of the image through the emitted light source, and selects at least one frame from the plurality of generated frames.

In accordance with an embodiment to achieve the technical solution, a computer-readable storage medium storing a program including instructions for controlling image capturing of an electronic device is provided. The computer-readable storage medium includes: a first instruction set for measuring ambient brightness; a second instruction set for making a light source emit light by controlling at least one of a brightness strength of the light source and an exposure time of the light source in order to capture an image according to the measured ambient brightness; a third instruction set for generating a plurality of frames corresponding to the capturing of the image through the emitted light source; and a fourth instruction set for selecting at least one frame from the plurality of generated frames.

In accordance with an embodiment to achieve the technical solution, a method of controlling a display by tracking the point of gaze is provided. The method includes: tracking the point of eye gaze; displaying a user interface for controlling a screen based on the tracked point of gaze on the screen; and executing a selected function according to selection of a predetermined menu on the user interface based on the tracked point of gaze.

In accordance with an embodiment to achieve the technical solution, an electronic device for controlling a display by tracking the point of gaze is provided. The electronic device includes: a screen that displays a user interface for controlling the screen; and a controller that tracks the point of eye gaze toward the screen and controls execution of a selected function according to selection of a predetermined menu of the user interface based on the tracked point of gaze.

In accordance with an embodiment to achieve the technical solution, a system for controlling a display by tracking the point of gaze is provided. The system includes: an eye tracking device including a light emitting unit including at least one light emitting element that emits light in order to track the point of eye gaze, and a camera that photographs the eye in response to detection of the light formed on the eye by the emitted light; and an electronic device including a screen that displays a user interface for controlling a screen, and a controller that tracks the point of eye gaze through the photographed eye and executes a selected function according to selection of a predetermined menu of the user interface based on the tracked point of eye.

Effects of the Invention

According to various embodiments of the present invention, it is possible to acquire a clearer image by making a light source emit light through a control of a brightness strength of the light source and an exposure time of the light source according to ambient brightness and also to reduce an amount of calculations by capturing the acquired image and calculating the image. According to the present invention, it is possible to track a more accurate point of eye gaze by tracking the point of eye gaze through the acquired image.

According to various embodiments of the present invention, the present invention provides an electronic device and a method for controlling a display by tracking the point of gaze, thereby increasing a use rate of the electronic device by users and executing a corresponding function through more accurate and rapid reception of a user's command based on the point of eye gaze. According to the present invention, as a user interface including functions to be provided to the electronic device is displayed on a screen, the user can perform an operation which the user desires through the point of eye gaze.

BRIEF DESCRIPTION OF THE DRAWINGS

FIG. 10B illustrates an example of an environment condition of eye location information settings according to an embodiment of the present invention;

MODE FOR CARRYING OUT THE INVENTION

Figure 1:
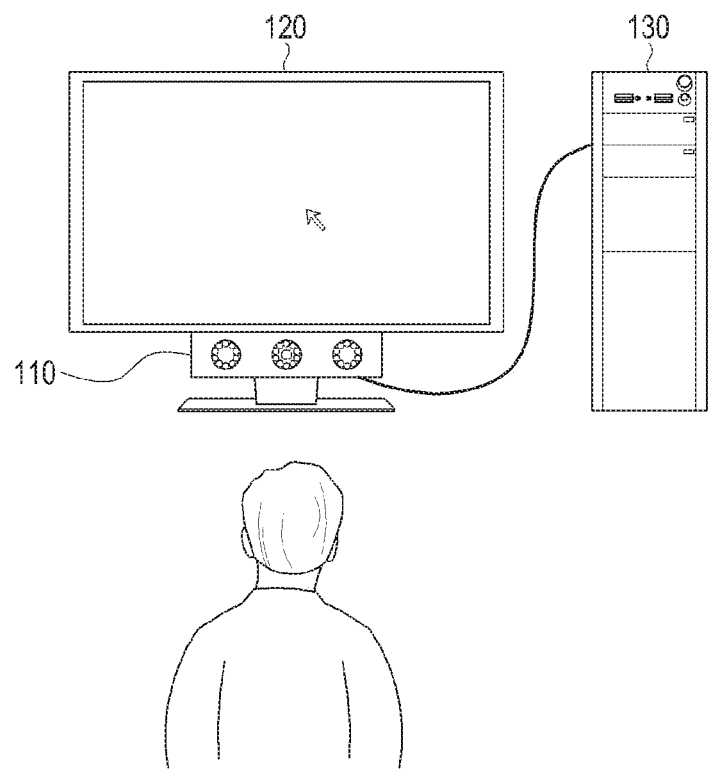
FIG. 1 illustrates an example of a system that controls a display by tracking the point of gaze according to an embodiment of the present invention.

Hereinafter, the present invention will be described with reference to the accompanying drawings. The present invention may have various modifications and embodiments and thus will be described in detail with reference to specific embodiments illustrated in the drawings. However, it should be understood that the present invention is not limited to the specific embodiments, but the present invention includes all modifications, equivalents, and alternatives within the spirit and the scope of the present invention. In connection with descriptions of the drawings, like reference numerals designate like elements.

In the present invention, the expression "include" or "may include" refers to existence of a corresponding function, operation, or element, and does not limit one or more additional functions, operations, or elements. The terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

In the present invention, the expression "or" includes any or all combinations of words enumerated together. For example, the expression "A or B" may include A, may include B, or may include both A and B.

In the present invention, expressions including ordinal numbers, such as "first" and "second," etc., may modify various elements. However, such elements are not limited by the above expressions. For example, the above expressions do not limit the sequence and/or importance of the corresponding constituent elements. The above expressions may be used merely for the purpose of distinguishing one element from the other elements. For example, a first user device and a second user device indicate different user devices although both of them are user devices. For example, a first element could be termed a second element, and similarly, a second element could be also termed a first element without departing from the scope of the present invention.

In the case where an element is referred to as being "connected" or "accessed" to other elements, it should be understood that not only the element is directly connected or accessed to the other elements, but also another element may exist between them. Contrarily, when an element is referred to as being "directly coupled" or "directly connected" to any other element, it should be understood that no element is interposed therebetween.

In the present invention, the terms are used to describe a specific embodiment, and are not intended to limit the present invention. As used herein, the singular forms are intended to include the plural forms as well, unless the context clearly indicates otherwise.

Unless defined differently, all terms used herein, which include technical terminologies or scientific terminologies, have the same meaning as that understood by a person skilled in the art to which the present invention belongs. Such terms as those defined in a generally used dictionary are to be interpreted to have the meanings equal to the contextual meanings in the relevant field of art, and are not to be interpreted to have ideal or excessively formal meanings unless clearly defined in the present specification.

An electronic device according to the present invention may be a device including a display control function. For example, the electronic device may include at least one of a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), an MP3 player, a mobile medical device, a camera, a wearable device (for example, a Head-Mounted-Device (HMD) such as electronic glasses, electronic clothes, an electronic bracelet, an electronic necklace, an electronic appcessory, an electronic tattoo, and a smart watch), and an eye tracking device.

Further, the eye tracking device according to the present invention corresponds to an electronic device tracking the point of eye gaze and may include a light emitting unit including at least one light emitting element that emits light to track the point of eye gaze and a camera that photographs the eyes in response to detection of the light focused on the eyes by the emitted light.

According to some embodiments, the electronic device may be a smart home appliance with a display function. The smart home appliances may include at least one of, for example, televisions, digital video disk (DVD) players, audio players, refrigerators, air conditioners, cleaners, ovens, microwaves, washing machines, air purifiers, set-top boxes, TV boxes (e.g., HomeSync™ of Samsung, Apple TV™, or Google TV™), game consoles, electronic dictionaries, electronic keys, camcorders, or electronic frames.

According to another embodiment, the electronic devices may include at least one of various medical devices {e.g., a magnetic resonance angiography (MRA), a magnetic resonance imaging (MRI), a computed tomography (CT) machine, and an ultrasonic machine}, navigation devices, global positioning system (GPS) receivers, event data recorders (EDR), flight data recorders (FDR), vehicle infotainment devices, electronic devices for ships (e.g., navigation devices for ships, and gyro-compasses), avionics, security devices, automotive head units, robots for home or industry, automatic teller's machines (ATMs) in banks, or point of sales (POS) in shops.

According to some embodiments, the electronic device may include at least one of a part of furniture or a building/structure having a display control function, an electronic board, an electronic signature receiving device, a projector, and various kinds of measuring instruments (e.g., a water meter, an electric meter, a gas meter, a radio wave meter, and the like). The electronic device according to the present invention may be a combination of one or more of the aforementioned various devices. Also, the electronic device according to the present invention may be a flexible device. Further, it will be apparent to those skilled in the art that the electronic device according to the present invention is not limited to the above-mentioned devices.

Hereinafter, an electronic device according to various embodiments of the present invention will be described with reference to the accompanying drawings. The term "user" used in various embodiments may refer to a person who uses an electronic device or a device (for example, an artificial intelligence electronic device) that uses an electronic device.

FIG. 1 illustrates an example of a system that controls a display by tracking the point of gaze according to an embodiment of the present invention.

Referring to FIG. 1, a system for controlling a display by tracking the point of gaze according to an embodiment of the present invention may include a screen 120, an eye tracking device 110, and an electronic device 130. The screen 120 may visually output an image, data, and information to a user and may display a mouse cursor in real time in response to the movement of the point of a user's eye gaze. Further, a user interface for controlling the display based on the point of eye gaze may be displayed.

The eye tracking device 110 corresponds to a device for tracking a user's eyes and may include a light emitting unit, a camera unit, a controller, a transceiver, a detection unit, and a storage unit. The light emitting unit may be located at the left side and the right side of the camera unit. Further, the light emitting unit may be constructed around the camera. The light emitting unit may include at least one light emitting element. The detection unit may be located at the exterior of the eye tracking device 110 and may measure ambient brightness. Further, the eye tracking device 110 may further include a sensor (not shown) for measuring a distance between a user's eye and the screen. The eye tracking device 110 may be installed in an upper part or a lower part of the screen 120. Further, the eye tracking device 110 may be installed at a location where the user's eyes can be tracked.

The eye tracking device 110 may emit light, photograph eyes through the emitted light, and analyze the photographed eyes, so as to track the point of gaze. The eye tracking device 110 may emit light through the light emitting unit, photograph eyes by the camera unit through the emitted light, and analyze the photographed eyes, so as to track the point of gaze. Further, the eye tracking device 110 may transmit information on a coordinate on the display according to the tracked point of gaze to the electronic device 130.

The electronic device 130 may receive the information on the coordinate directed by the point of gaze from the eye tracking device 110, display a user interface for controlling a mouse cursor on the screen 120 based on the point of eye gaze, and display the mouse cursor at a position corresponding to the received information. The electronic device 130 may determine whether the mouse cursor is located on a menu of the displayed user interface. Further, when a predetermined menu of the user interface is selected, the electronic device 130 may execute a function corresponding to the selected menu.

Figure 2:
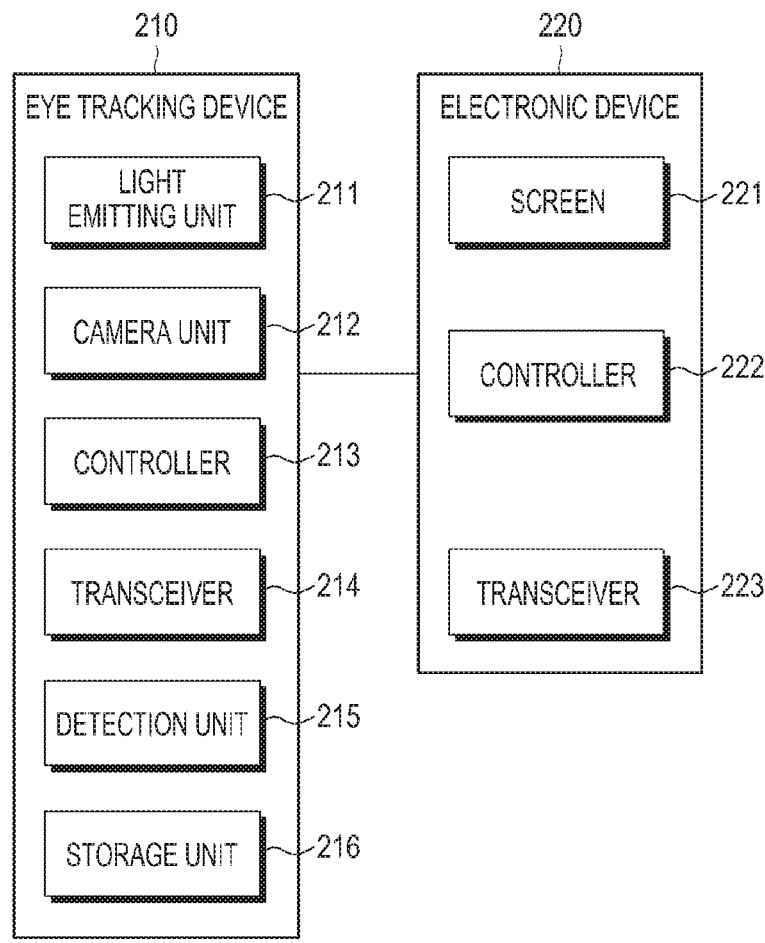
FIG. 2 illustrates examples of a block diagram of an eye tracking device and a block diagram of an electronic device according to an embodiment of the present invention.

FIG. 2 illustrates examples of a block diagram of an eye tracking device and a block diagram of an electronic device according to an embodiment of the present invention.

Referring to FIG. 2, an eye tracking device 210 may correspond to a device for tracking a user's eye and may include a light emitting unit 211, a camera unit 212, a controller 213, a transceiver 214, a detection unit 215, and a storage unit 216. Further, the eye tracking device may further include a sensor (not shown) that may measure a distance between the user's eye and the screen. In addition, the electronic device 220 may correspond to a device that may control the display based on the point of eye gaze tracked through the eye tracking device and may include a screen 221, a controller 222, and a transceiver 223.

The eye tracking device 210 may be installed in an upper part or a lower part of the screen 120. Further, the eye tracking device 210 may be installed at a location where the user's eye can be tracked. The light emitting unit 211 of the eye tracking device 210 may include at least one light emitting element that may emit light. The light emitting elements may include Light Emitting Diodes (LEDs). The light emitting elements may emit light in a predetermined unit of time. When the light is emitted by at least one light emitting element and the light is focused on the eye, the camera unit 212 may detect the light focused on the eye and photograph the eye.

The light emitting unit 211 may include a first light source including at least one light emitting element formed to surround the camera and a second light source including at least one light emitting element, the second light source being spaced apart from the camera by a predetermined distance. The second light source may be formed on the left side and the right side or the upper part and the lower part based on the camera.

The camera unit 212 is a device for capturing a still image and a video, and may include one or more image sensors (for example, a front sensor or a rear sensor), a lens (not illustrated), an Image Signal Processor (ISP) (not illustrated), or a flash (not illustrated) (for example, an LED or xenon lamp).

The detection unit 215 may detect or measure ambient brightness or a brightness strength. The detection unit 215 may store a value corresponding to the measured ambient brightness in the storage unit 216 and transfer the value to the controller 213. The detection unit 215 may measure a physical quantity or detect an operating state of the electronic device 210, and convert the measured or detected information into an electric signal. The detection unit 215 may include, for example, at least one of a color sensor (for example, an RGB (red, green, and blue) sensor), a temperature/humidity sensor, an illumination sensor, and an Ultra Violet (UV) sensor. Additionally or alternatively, the detection unit 215 may include an iris sensor (not shown). Further, the detection unit 215 may include various sensors that may detect a strength of ambient brightness and an amount of brightness as well as the plurality of aforementioned sensors. The detection unit 215 may further include a control circuit for controlling at least one sensor included therein.

The storage unit 216 may store instructions or data received from or generated by the controller 213 or other elements (for example, the light emitting unit 211, the camera unit 212, the transceiver 214, and the detection unit 215).

The controller 213 may track the point of eye gaze based on a distance between a central point of the eye (for example, central point of the iris) and the light focused on the eye. The controller 213 may track the point of eye gaze based on the distance between the eye and the screen 120 and the distance between the central point of the eye and the light focused on the eye. For example, when the user looks at the light emitting elements in a state where the distance between the eye and the screen 120 has been calculated or measured, the light focused on the eye may be located at the center part of the eye. Further, for example, when the user looks at an upper portion of the screen 120 in the state where the distance between the eye and the screen 120 has been calculated or measured, the light emitted by the light emitting elements may exist at the same position as that of the case where the user looks at the light emitting elements, but the iris may be upwardly located in the eye in accordance with the directed position. In this case, the controller 213 may calculate a distance and an angle between the central point of the eye and the light focused on the eye and may determine where the user is looking on the screen. The controller 213 may photograph the eye in the predetermined unit of time or photograph the eye in response to detection of the movement of the eye.

The controller 213 may photograph the eye by detecting the focusing of the light emitted from the light emitting elements on the eye. The controller 213 may emit a light source by controlling at least one of a brightness strength of the light source and an exposure time of the light source of the light emitting unit 211 to capture an image in accordance with ambient brightness measured by the detection unit 215, generate a plurality of frames corresponding to the captured image based on the emitted light source, and select at least one of the plurality of generated frames. The controller 213 may emit the light source by synchronizing the emission of the light source with at least one of a vertical synchronization signal and a horizontal synchronization signal. The controller 213 may alternately emit the first light source and the second light source included in the light emitting unit 211 according to an active interval of the vertical synchronization signal. The controller 213 may emit the first light source in a first active interval of the vertical horizontal signal, emit the second light source in a second active interval corresponding to the next interval of the first active interval, and emit the first light source in a third active interval corresponding to the next interval of the second active interval. As described above, the controller 213 may alternately emit the first light source and the second light source in the active intervals of the vertical synchronization signal. Further, the controller 213 may alternately emit the first light source and the second light source included in the light emitting unit 211 according to an active interval of the horizontal synchronization signal.

The controller 213 may emit the light source by synchronizing a brightness strength of the light source and an exposure time of the light source with at least one of the vertical synchronization signal and the horizontal synchronization signal. In making the light sources emit light, the controller 213 may control the brightness strength and the exposure time of each light emitting element of the first light source and each light emitting element of the second light source included in the light emitting unit 211. In making the light sources emit light in real time in accordance with ambient brightness, the controller 213 may control in real time the brightness strength and the exposure time of each light emitting element of the first light source and each light emitting element of the second light source included in the light emitting unit 211. The controller 213 may control at least one of the strength and the exposure time of the light source to make the brightness of the light source brighter than the ambient brightness. The controller 213 may control in real time at least one of the strength and the exposure time of the light source to make the brightness of the light source brighter than the ambient brightness. The controller 213 may control the brightness of the light source through equation (1) below.

$$E_L = \int_{t_1}^{t_2} nC \cdot i_{LED}(t)dt, \ t_1 < t_2 \text{ and } t_1 \neq t_2 \quad \text{equation (1)}$$

In equation (1) above, n denotes the number of light emitting elements, C denotes brightness of the light emitting elements, $i_{LED}(t)$ denotes an amount of current converted from the brightness of the light of the light emitting elements, t1 denotes a minimum time, and t2 denotes a maximum time.

When the brightness of the light emitting elements is calculated through equation (1), a strength of light generated by subtracting the ambient brightness from the calculated brightness of the light emitting elements may be smaller than a light strength that does not cause injury to people (for example, a light strength that does not cause eye-strain) and larger than a minimum light strength to track the eye. When the brightness of the light emitting elements becomes a proper brightness by controlling the brightness of at least one light emitting element through equation (1) above, the controller 213 may capture an image to track the eye.

The controller 213 may emit the light source by controlling the exposure time of the light source to be shorter than the active interval of the vertical synchronization signal. The controller may generate a plurality of frames according to the captured image through the emitted light source and select at least one good quality frame from the plurality of generated frames. The quality may include a Signal to Noise Ratio (SNR). The plurality of generated frames may be frames generated in the predetermined unit of time in the active interval of the vertical synchronization signal. Further, at least one selected frame may be frames brighter than the other frames that have not been selected.

The controller 213 may track the point of a user's eye gaze through at least one selected frame. The controller 213 may control the screen 221 of the electronic device 220 to be the same as or similar to various functions provided by the mouse or the keypad based on the tracked point of gaze.

The controller 213 may transmit information on a coordinate on the display according to the tracked point of gaze to the electronic device 220 through the transceiver 214. The controller 213 of the eye tracking device 210 may recognize coordinate information of an upper left end, a lower left end, an upper right portion end and a lower right end of the screen. Further, the controller 213 may analyze or track where the point of eye gaze is located on the screen by analyzing the photographed eye. When it is determined that the point of gaze moves to the outside of the screen, the controller 213 may display a user interface on the edges of the screen 221. In general, the movement of the eye may frequently occur, and the controller 213 may continuously perform a process of photographing the eye and tracking the point of eye gaze through the photographed eye in order to track the point of eye gaze according to the frequency occurrence of the eye movement. Further, the controller 213 may transmit a result of the eye tracking (for example, coordinate information of a position where the point of eye gaze is currently staying) to the electronic device 220. As described above, the controller 213 may track the point of eye gaze through the photographed eye, analyze information on a coordinate of the screen where the tracked point of eye gaze is located, and transmit the information to the electronic device 220. Further, the controller 213 may transmit the photographed eye to the electronic device 220.

The electronic device 220 may include an electronic device of which a screen and a main body are connected such as a PC or a notebook, include an integrated electronic device such as a tablet PC or a smart phone, or include a wearable device such as a smart watch or smart glasses that can be worn on the user's body. The electronic device 220 may correspond to a device for tracking the point of a user's eye gaze and controlling the display through the tracked point of eye gaze, and may include the screen 221, the controller 222, and the transceiver 223. Further, the electronic device 220 may further include a sensor (not shown) that may measure a distance between the user's eye and the screen.

The screen 221 of the electronic device 220 may visually output an image, data, and information to the user and may display a mouse cursor in real time in response to the movement of the point of user's eye gaze. Further, a user interface for controlling the display based on the point of eye gaze may be displayed. The user interface may be automatically executed in response to the tracking of the eye and displayed on the screen 221 or may be executed by an execution command and displayed on the screen 221. The controller 222 may control a size of the user interface displayed on the screen 221 or change a location of the user interface based on the point of eye gaze or according to a user's input.

Further, the controller 222 of the electronic device 220 may display the user interface for controlling the mouse cursor on the screen 221 through the eye. The controller 222 may analyze the point of eye gaze through the photographed eye and receive a tracking result corresponding to the location on the screen through the transceiver 223 according to the movement of the eye. The result may be received according to the movement of the eye or in the predetermined unit of time. As described above, the controller 222 may receive the eye tracking result (for example, coordinate information of the position where the point of eye gaze is currently staying) from the eye tracking device 210. The controller 222 may display the user interface for controlling the mouse cursor based on the point of eye gaze. The controller 222 may display the user interface for controlling the screen based on the traced point of gaze at a predetermined location of the screen 221. The location of the user interface can be changed on the screen 221 and the user interface may be displayed in a circular type or a rectangular type. The user interface may be displayed as a tray icon. The user interface may be displayed on the screen 221 before or after the information on the coordinate is received. The user interface may be automatically executed in response to the tracking of the eye and displayed on the screen 221 or may be executed by an execution command and displayed on the screen 221. The controller 222 may control a size of the user interface displayed on the screen 221 or change a location of the user interface based on the point of eye gaze or according to a user's input.

The controller 222 may analyze a result of the photographing of the eye to track the point of eye gaze and display the mouse cursor at the tracked position. The controller 222 may receive at least one photographed image from the eye tracking device 210 through the transceiver 223. The controller 222 may track the point of eye gaze through at least one received image. The controller 222 may track the point of eye gaze based on a distance between a central point of the eye (for example, a central point of the iris) and light focused on the eye. The controller 222 may track the point of eye gaze based on the distance between the eye and the screen 120 and the distance between the central point of the eye and the light focused on the eye. For example, when the user looks at the light emitting elements in a state where the distance between the eye and the screen 120 has been calculated or measured, the light focused on the eye may be located at the center part of the eye. Further, for example, when the user looks at an upper portion of the screen 120 in the state where the distance between the eye and the screen 120 has been calculated or measured, the light emitted by the light emitting elements may exist at the same position as that of the case where the user looks at the light emitting elements, but the iris may be upwardly located in the eye in accordance with the directed position. In this case, the controller 222 may calculate a distance and an angle between the central point of the eye and the light focused on the eye and may determine where the user is looking on the screen.

The controller 222 may track the point of eye gaze by analyzing the image received from the eye tracking device 210. Further, the controller 222 may display the mouse cursor at a position corresponding to the tracked point of gaze. The controller 222 may determine whether the point of eye gaze is staying on the user interface or staying at a predetermined position of the screen 221 through the information received from the eye tracking device 210. The controller 222 may determine the position where the point of eye gaze is staying through the received information, and may display the cursor to the determined position or move a location of the cursor. The controller 222 may move in real time the location of the mouse cursor according to the movement of the point of eye gaze. The controller 222 may determine if the displayed cursor according to the tracked point of gaze is located on a predetermined menu of the user interface. The controller 222 may detect an input for selecting a predetermined menu of the user interface. A shape of the cursor may vary depending on a selected menu.

When the mouse cursor is located on the menu of the user interface, the controller 222 may execute a function corresponding to the menu where the mouse cursor is located. The controller 222 may determine if the mouse cursor is located on a predetermined menu of the user interface. The controller 222 may determine if the menu is selected in a state where the cursor is located on the predetermined menu of the user interface. The controller 222 may detect an input for selecting the predetermined menu. The input may include at least one of a case where the user blinks and a case where the tracked point of gaze stays for a time longer than a predetermined time. The controller 222 may detect at least one of the case where user blinks and the case where the tracked point of gaze stays for a time longer than a predetermined time and determine that the predetermined menu is selected. In order to apply a function of the menu selected through the input, the controller 222 may maintain the function in an active state. When the menu is selected, the controller 222 may provide a visual effect (for example, shading processing) to the selected menu or output a voice informing that the menu has been selected. The controller 222 may output a selection result to allow the user to recognize the selection of the menu through various methods that can be recognized by the user. The controller 222 may execute a function corresponding to the selected menu. The controller 222 may execute a predetermined menu function at a position where the point of eye gaze is located on the screen 221. When the point of gaze moves to another position after the function corresponding to the selected menu is maintained in an active state and an input is detected on the other moved position, the controller 222 may execute the function in the active state at the other position.

Figure 3:
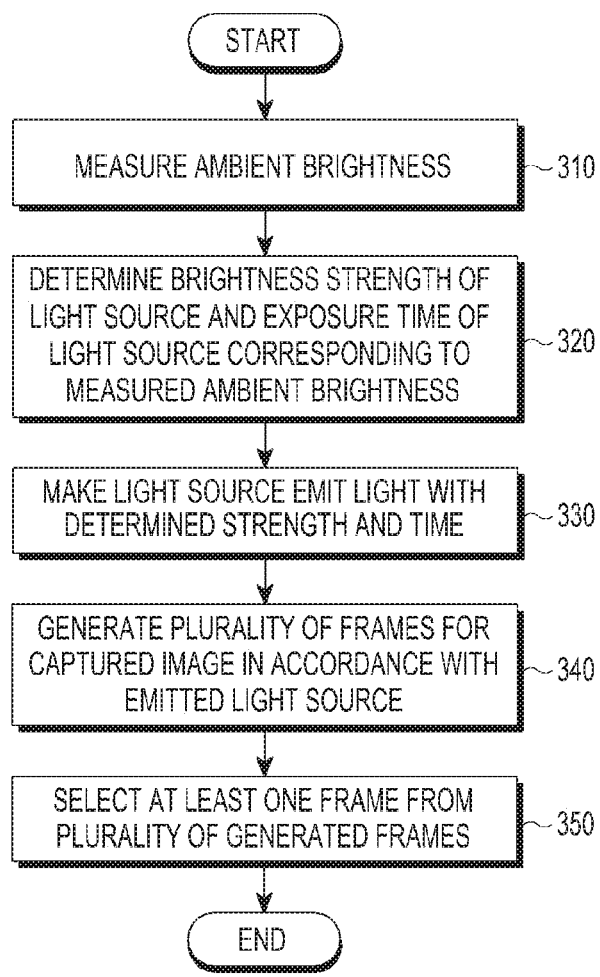
FIG. 3 is a flowchart illustrating a process of capturing an image to track the line of eye gaze according to an embodiment of the present invention.

FIG. 3 is a flowchart illustrating a process of capturing an image to track the point of eye gaze according to an embodiment of the present invention.

Hereinafter, the process of capturing the image to track the point of eye gaze according to the embodiment of the present invention will be described below in more detail with reference to FIG. 3.

The eye tracking device 210 may measure ambient brightness in step 310. The eye tracking device 210 may determine the ambient brightness by measuring illumination. The eye tracking device 210 may measure the ambient brightness through the detection unit 215. The detection unit 215 may measure the ambient brightness in real time and transfer a result of the measurement to the controller 213. The detection unit 215 may be located at the exterior of the eye tracking device 110 and measure the ambient brightness in real time. The detection unit 215 may detect or measure a strength and an brightness amount of the ambient brightness.

The eye tracking device 210 may determine a brightness strength of a light source and an exposure time of the light source corresponding to the measured ambient brightness in step 320. The eye tracking device 210 may synchronize the brightness strength of the light source and the exposure time of the light source with timing of at least one of the vertical synchronization signal and the horizontal synchronization signal. The exposure time of the light source may be shorter than an active interval of the vertical synchronization signal.

The eye tracking device 210 may emit the light source with the determined strength and time in step 330. The eye tracking device 210 may emit the light source by synchronizing the brightness strength of the light source and the exposure time of the light source with timing of at least one of the vertical synchronization signal and the horizontal synchronization signal. When making the light source emit light, the eye tracking device 210 may control the brightness strength and the exposure time of each light emitting element of the first light source and each light emitting element of the second light source included in the light emitting unit 211. In making the light source emit light in real time according to the ambient brightness, the eye tracking device 210 may control the brightness strength and the exposure time of each light emitting element of the first light source and each light emitting element of the second light source included in the light emitting unit 211. The eye tracking device 210 may control at least one of the strength and the exposure time of the light source such that the brightness of the light source becomes brighter than the ambient brightness. The eye tracking device 210 may control at least one of the strength and the exposure time of the light source in real time such that the brightness of the light source becomes brighter than the ambient brightness. The eye tracking device 210 may emit the light source by controlling the exposure time of the light source to be shorter than the active interval of the vertical synchronization signal.

The eye tracking device 210 may generate a plurality of frames for the captured image in accordance with the emitted light source in step 340. The generated frames may be frames generated in the unit of predetermined time in the active interval of the vertical synchronization signal. The generated frames may have different qualities. The quality may include a Signal to Noise Ratio (SNR). Each of the generated frames may be stored in the storage unit 216. The eye tracking device 210 may generate at least one frame for the captured image in the unit of predetermined time. The generated frames may be frames captured in the active interval of the vertical synchronization signal.

The eye tracking device 210 may select at least one frame from the plurality of generated frames in step 350. The eye tracking device 210 may measure the quality of each of the generated frames. The eye tracking device 210 may select at least one frame having the good quality through the SNR. The eye tracking device 210 may analyze the SNR of each frame and select frames of which the analyzed SNR is larger than or equal to a predetermined threshold value. The eye tracking device 210 may select at least one frame having brightness larger than or equal to a threshold value among the generated frames. The eye tracking device 210 may track the point of eye gaze through at least one selected frame.

Figure 4:
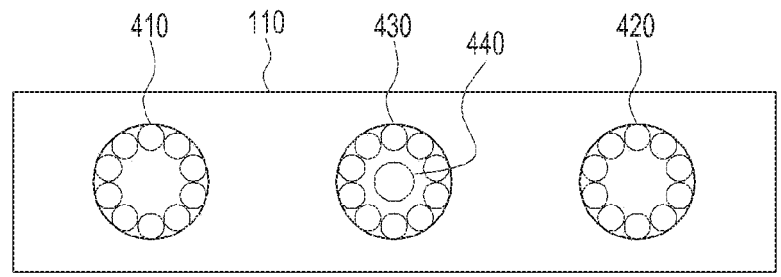
FIG. 4 illustrates an example of the exterior of the eye tracking device that tracks the point of eye gaze according to an embodiment of the present invention.

FIG. 4 illustrates an example of the exterior of the eye tracking device that tracks the point of eye gaze according to an embodiment of the present invention.

Referring to FIG. 4, the eye tracking device 110 that tracks the point of eye gaze according to the embodiment of the present invention may include a first light source 430 including a camera 440 and at least one light emitting element, and second light sources 410 and 420 including at least one light emitting element on the left and right sides of the first light source 430. Each light source may include a plurality of light emitting elements. The eye tracking device 110 may control at least one of the brightness strength and the exposure time of each light emitting element included in each light source. The eye tracking device 110 may capture the eye by emitting the second light source after emitting the first light source. The eye tracking device 110 may emit at least one of the first light source and the second light source to be brighter than the ambient brightness. The eye tracking device 110 may charge light reflected by the emission of at least one of the first light source and the second light source in the image sensor with constant electrons. The image sensor may be included in the camera. Further, the eye tracking device 110 may measure an amount of the charged electrons in a voltage form and convert it into a digital value.

Figure 5:
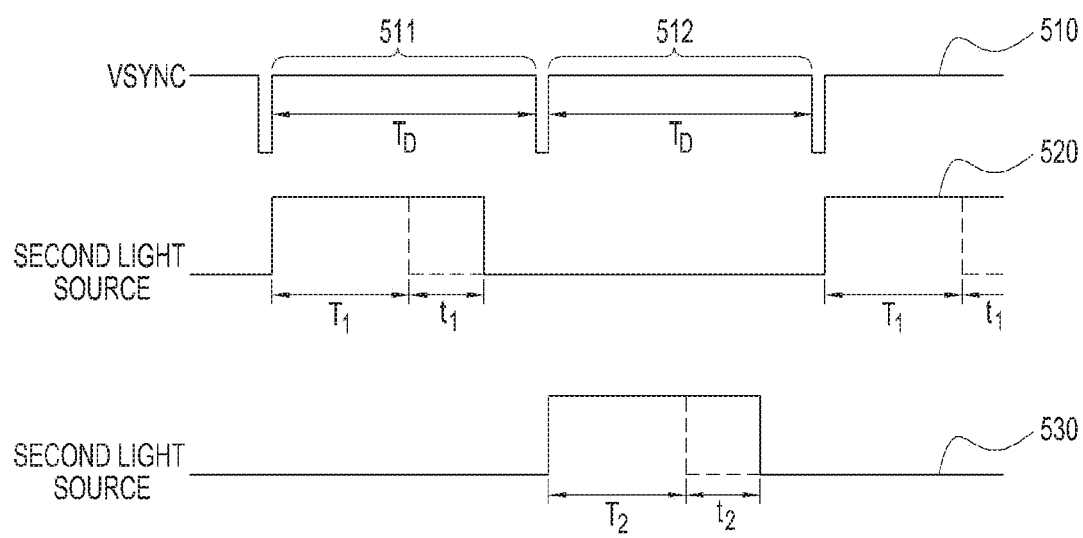
FIG. 5 is a timing diagram in which a light source is emitted in accordance with a vertical synchronization signal according to an embodiment of the present invention.

FIG. 5 is a timing diagram in which a light source is emitted in accordance with a vertical synchronization signal according to an embodiment of the present invention.

Referring to FIG. 5, a vertical synchronization signal 510 may be activated in the unit of predetermined time ($T_D$). A first light source may be emitted in a first active interval 511 of the vertical synchronization signal 510 as indicated by a reference numeral 520, and a second light source may be emitted in a second active interval 512 of the vertical synchronization signal 510 as indicated by a reference numeral 530. The first light source and the second light source may be alternately emitted in the active intervals of the vertical synchronization signal. The eye tracking device 110 may increase ($T_1+t_1$) an exposure time of the first light source according to ambient brightness and make the light source emit light. The eye tracking device 110 may increase the exposure time of the first light source by a predetermined time ($t_1$) and make the light source emit light. The eye tracking device 110 may control the emission of the first light source by setting the increased exposure time ($T_1+t_1$) of the first light source to be shorter than the first active interval ($T_D$) of the vertical synchronization signal. The eye tracking device 110 may control the emission of the second light source by setting the increased exposure time ($T_2+t_2$) of the second light source to be shorter than the second active interval ($T_D$) of the vertical synchronization signal. The eye tracking device 110 may make the light source emit light by controlling at least one of the brightness strength of the first light source 430 and the exposure time of the light source of FIG. 4 according to the timing diagram of the first light source. The eye tracking device 110 may make the light sources emit light by controlling at least one of the brightness strength of the second light sources 410 and 420 and the exposure time of the light sources of FIG. 4 according to the timing diagram of the second light source. The brightness strength and the exposure time of the first light source 430 may be controlled and emitted to be different from the brightness strength and the exposure time of the second light sources 410 and 420 according to the ambient brightness. The brightness strength and the exposure time of each of the second light sources 410 and 420 may be controlled and emitted to be different depending on the ambient brightness. In order to uniformly balance and stabilize leakage of sequential frames, the exposure should be synchronized with timing of image framing. The reason is that signals synchronized with the line images are associated with natural image cuts and the natural images are captured according to the signals synchronized with the line images regardless of whether light of a light source is sufficiently bright or not on timing.

Figure 6:
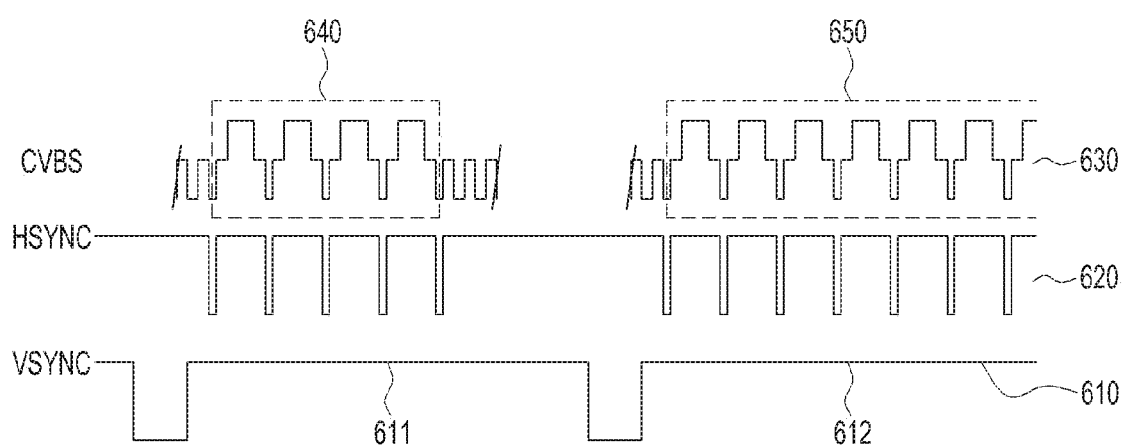
FIG. 6 is a timing diagram in which a plurality of frames are generated based on a vertical synchronization signal according to an embodiment of the present invention.

FIG. 6 is a timing diagram in which a plurality of frames are generated based on a vertical synchronization signal according to an embodiment of the present invention.

Referring to FIG. 6, in an active interval of a vertical synchronization signal 610, a horizontal synchronization signal 620 may have a plurality of active intervals. At least one frame may be generated in accordance with emission of at least one of the first light source and the second light source during the plurality of active intervals of the horizontal synchronization signal 620. The eye tracking device 110 may select at least one frame having a good quality in a frame interval 640 generated in a first interval 611 of the horizontal synchronization signal 620. The eye tracking device 110 may select at least one frame having a good quality in a frame interval 650 generated in a second interval 612 of the horizontal synchronization signal 620. The first interval 640 is a set of at least one frame generated by the emission of the first light source 430 and the second interval 650 is a set of at least one frame generated by the emission of the second light sources 410 and 420. The eye tracking device 110 may track the point of a user's eye gaze through at least one selected frame. At least one selected frame may be frames having small afterimages. Referring to FIG. 6, interlaced scanning is performed from a first line to an $N^{th}$ line, the horizontal synchronization signal is generated per line, and, when one frame is fully filled with the lines, the vertical synchronization signal is generated once. For example, when the horizontal synchronization signal is used for making the light source emit light, the horizontal synchronization signal has a time of 63.5p, and there may be about 1600 horizontal synchronization signals and 30 vertical synchronization signals per second. One vertical synchronization signal may correspond to about 60 horizontal synchronization signals.

The eye tracking device 110 may compare the ambient brightness and an image sensor value in order to control an amount of current supplied to at least one of the first light source and the second light source. For example, when the ambient brightness is brighter, the eye tracking device 110 may allow the image sensor to acquire uniform illumination by increasing the amount of current supplied to at least one of the first light source and the second light source. When the ambient brightness is darker, the eye tracking device 110 may decrease the amount of current supplied to at least one of the first light source and the second light source and, accordingly, acquire a good quality image.

For example, when the number of generated frames is 30, the eye tracking device 110 may reduce an amount of calculations ⅓₀ to ⅒ times by capturing and calculating 1 to 3 good quality frames.

Figure 7:
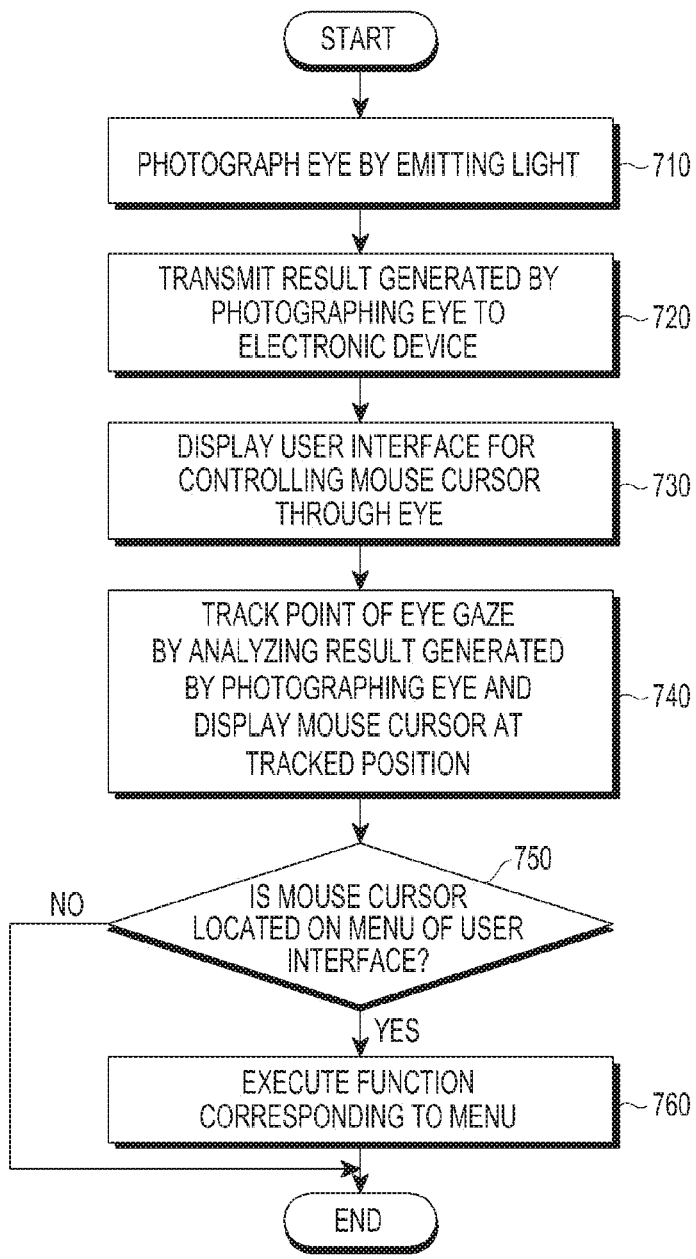
FIG. 7 is a flowchart illustrating a process for controlling a display by tracking the point of eye gaze according to an embodiment of the present invention.

FIG. 7 is a flowchart illustrating a process for controlling a display by tracking the point of eye gaze according to an embodiment of the present invention.

Hereinafter, the process for controlling the display by tracking the point of eye gaze according to the embodiment of the present invention will be described below in detail with reference to FIG. 7.

The eye tracking device 210 may emit light to photograph the eye in step 710. The eye tracking device 210 may include a light emitting unit including at least one light emitting element that may emit light. The eye tracking device 210 may be installed in at least one of an upper part, a lower part, a left part, and a right part of the screen 120. Further, the eye tracking device 210 may be installed at a position to easily track the user's eye. The eye tracking device 210 may include the light emitting unit 211 including at least one light emitting element that may emit light, a sensor (not shown) that calculates or measures a distance between the eye and the screen, the camera unit 212 that photographs the eye, the controller 213 that controls the photographing of the eye in response to detection of light formed on the eye by the emitted light and tracks the point of eye gaze based on at least one of a distance between the central point of the photographed eye and the detected light and the calculated distance, and the transceiver 214 that transmits information on the tracked point of eye gaze to the electronic device 130. The light emitting elements may include Light Emitting Diodes (LEDs). The light emitting elements may emit light in the predetermined unit of time.

The eye tracking device 210 may transmit a result generated by photographing the eye to the electronic device 220 in step 720. The eye tracking device 210 and the electronic device 220 may transmit and receive data wirelessly or through a wire. The eye tracking device 210 and the electronic device 220 may be connected through a USB (Universal Serial Bus). The eye tracking device 210 may photograph the eye in the unit of predetermined time or photograph the eye in response to detection of a movement of the eye. Further, the eye tracking device 210 may photograph the eye by detecting the formation of the light emitted by the light emitting elements on the eye. When the light is emitted by at least one light emitting element and is formed on the eye, the eye tracking device 210 may photograph the eye by detecting the light formed on the eye and transmit the photographed image to the electronic device

220. The eye tracking device 210 may transmit at least one image photographed in response to the movement of the eye to the electronic device 220.

The electronic device 220 may display a user interface for controlling a mouse cursor through the eye in step 730. The electronic device 220 may photograph the eye by the eye tracking device 210, analyze the point of eye gaze through the photographed eye, and receive a location on the screen corresponding to the tracked result according to the movement of the eye. The result may be received according to the movement of the eye or in the predetermined unit of time. As described above, the electronic device 220 may receive the result of the eye tracking (for example, coordinate information on a position where the point of eye gaze is currently staying) from the eye tracking device 210. The electronic device 220 may display the user interface for controlling the mouse cursor through the point of eye gaze. The electronic device 220 may display a user interface for controlling a screen through the tracked point of gaze at a predetermined location on the screen 221. The location of the user interface can be changed on the screen 221 and the user interface may be displayed in a circular type or a rectangular type. The user interface may be displayed as a tray icon. The user interface may be displayed on the screen 221 before or after the information on the coordinate is received. The user interface may be automatically executed in response to the tracking of the eye and displayed on the screen 221 or may be executed by an execution command and displayed on the screen 221.

The user interface may include a first group having a menu corresponding to at least one function provided by the mouse and a second group having a menu corresponding to at least one function for controlling the display through the point of eye gaze. The first group may include at least one of a menu corresponding to a left click of the mouse, a menu corresponding to a right click of the mouse, a menu corresponding to a left double click of the mouse, a menu corresponding to a drag using the mouse, a menu corresponding to a scroll using the mouse, and a menu corresponding to page switching using the mouse. The second group may include at least one of a menu for activating the user interface, a menu for deactivating the user interface, a menu for setting the user interface, a menu for enlarging an area where the cursor of the mouse is located, a menu for switching between an eye mouse using the point of eye gaze and the normal mouse, a menu for setting a function of the eye mouse, a menu for setting location information of the eye, a menu for a camera view, a menu for setting a short-cut key, a menu for selecting data displayed on the screen, a menu for copying the selected data, a menu for pasting the copied data, and a menu corresponding to a space bar of a keyboard. The menu for setting the user interface may include at least one of a menu for selecting a type of the user interface, a menu for controlling attributes of the eye mouse, a menu for controlling attributes of a camera that photographs the eye, and a menu for providing an additional function of the user interface. When the user interface is in the circular type, the first group may be located at the central part and the second group may be located outside the first group. Further, when the user interface is in the rectangular type, the first group may be located above the second group. In addition, the user interface may further include at least one of a menu for changing a displayed location and a menu for ending the user interface.

The electronic device 220 may track the point of eye gaze by analyzing the result generated by photographing the eye and display the mouse cursor at the tracked position in step 740. The electronic device 220 may receive at least one photographed image from the eye tracking device 210. The electronic device 220 may track the point of eye gaze through at least one received image. The electronic device 220 may track the point of eye gaze based on a distance between the central point of the eye (for example, central point of iris) and the light formed on the eye. The electronic device 220 may track the point of eye gaze based on the distance between the eye and the screen 120 and the distance between the central point of the eye and the light formed on the eye. For example, when the user looks at the light emitting elements in a state where the distance between the eye and the screen 120 has been calculated or measured, the light focused on the eye may be located at the center part of the eye. Further, For example, when the user looks at the upper part of the screen 120 in the state where the distance between the eye and the screen 120 has been calculated or measured, the light emitted by the light emitting elements may be located at the same position as that when the user looks at the light emitting elements, but the iris may be located upwardly in the eye in accordance with the directed point. In this case, the electronic device 220 may calculate a distance and an angle between the central point of the eye and the light formed on the eye and determine where the user looks at on the screen.

The electronic device 220 may track the point of eye gaze by analyzing the image received from the eye tracking device 210. Further, the controller 222 may display the mouse cursor at a position corresponding to the tracked point of gaze. The electronic device 220 may determine whether the point of eye gaze is staying on the user interface or staying on a predetermined position of the screen 221 through the information received from the eye tracking device 210. The electronic device 220 may determine where the point of eye gaze is staying on through the received information, and display the cursor at the determined position or move the cursor to the determined position. The electronic device 220 may move the cursor of the mouse in real time according to a movement of the point of eye gaze. The electronic device 220 may determine whether the cursor displayed according to the tracked point of gaze is located on a predetermined menu of the user interface. The electronic device 220 may detect an input for selecting a predetermined menu on the user interface. A shape of the cursor may vary depending on a selected menu.

When the mouse cursor is located on the menu of the user interface in step 750, the electronic device 220 may execute a function corresponding to the menu on which the mouse cursor is located in step 760. The electronic device 220 may determine whether the mouse cursor is located on the predetermined menu of the user interface. In the state where the cursor is located on the predetermined menu of the user interface, the electronic device 220 may determine whether the menu is selected. The electronic device 220 may detect an input for selecting the predetermined menu. The input may include at least one of cases where a voice is input, eye blinking is made, and the tracked point of gaze stays for a time longer than a predetermined time. When the electronic device 220 detects at least one of cases where a voice is input, eye blinking is made, and the tracked point of gaze stays for a time longer than a predetermined time, it may be determined that the predetermined menu is selected. The electronic device 220 may maintain the function in an active state to apply the function of the menu selected through the input. When the menu is selected, the electronic device 220 may provide a visual effect (for example, shading processing) to the selected menu or output a voice informing that the menu is selected. The electronic device 220 may output a selection result to allow the user to recognize the selection of the menu through various methods that can be recognized by the user. The electronic device 220 may execute a function corresponding to the selected menu. The electronic device 220 may execute a predetermined menu function at the position where the point of eye gaze is located on the screen 221. When the point of gaze moves to another position and an input is detected at the moved other position after the function corresponding to the selected menu is maintained in the active state, the electronic device 220 may execute a function of the active state at the other position. The input may include at least one of cases where a voice is input, eye blinking is made, and the tracked point of gaze stays for a time longer than a predetermined time. For example, when the point of gaze is located on the menu of the user interface (for example, right click of the mouse) and the input is detected, the electronic device 220 may maintain the function of the menu in a ready state. When the input is detected in a state where the point of gaze moves to another position, the electronic device 220 may execute the function of the menu on the moved position.

Figure 8:
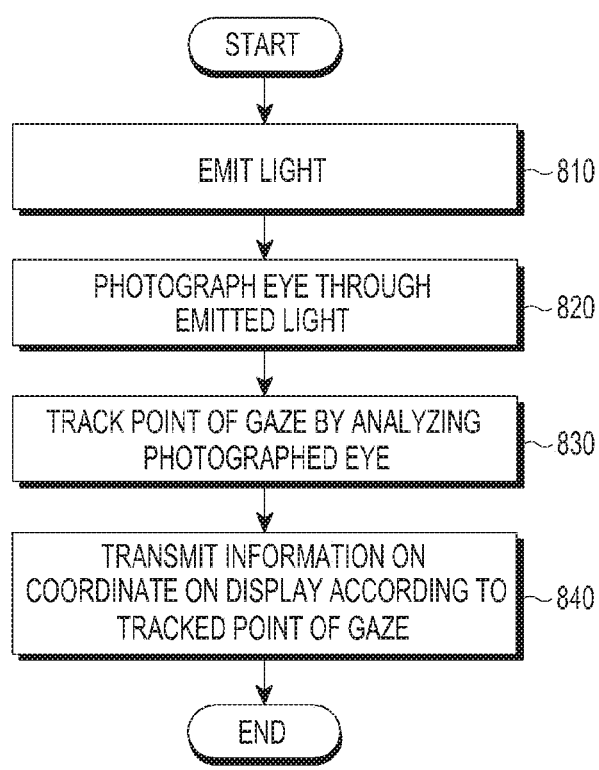
FIG. 8 is a flowchart illustrating a process for tracking the point of eye gaze according to an embodiment of the present invention.

FIG. 8 is a flowchart illustrating a process for tracking the point of eye gaze according to an embodiment of the present invention.

Hereinafter, the process for tracking the point of eye gaze according to the embodiment of the present invention will be described below in detail with reference to FIG. 8.

The eye tracking device 210 may emit light in step 810. The eye tracking device 210 may be installed on an upper part or a lower part of the screen 120. Further, the eye tracking device 210 may be installed at a location where the user's eye can be tracked. The eye tracking device 210 may include the light emitting unit 211 including at least one light emitting element that may emit light, a sensor (not shown) that may calculate or measure a distance between the eye and the screen, the camera unit 212 that photographs the eye, the controller 213 that controls the photographing of the eye in response to detection of light formed on the eye by the emitted light and tracks the point of eye gaze based on at least one of a distance between the central point of the photographed eye and the detected light and the calculated distance, and the transceiver 214 that may transmit information on the tracked point of eye gaze to the electronic device 130. The light emitting elements may include Light Emitting Diodes (LEDs). The light emitting elements may emit light in the predetermined unit of time.

The eye tracking device 210 may photograph the eye through the emitted light in step 820, and analyze the photographed eye and track the point of gaze in step 830. When the light is emitted by at least one light emitting element and is formed on the eye, the eye tracking device 210 may detect the light formed on the eye and photograph the eye. The eye tracking device 210 may track the point of eye gaze based on a distance between a central point of the eye (for example, central point of the iris) and the light formed on the eye. The eye tracking device 210 may track the point of eye gaze based on a distance between the eye and the screen 120 and the distance between the central point of the eye (for example, central point of the iris) and the light formed on the eye. For example, when the user looks at the light emitting device in a state where the distance between the eye and the screen 120 has been calculated or measured, the light focused on the eye may be located at the center part of the eye. Further, For example, when the user looks at the upper part of the screen 120 in the state where the distance between the eye and the screen 120 has been calculated or measured, the light emitted by the light emitting elements may be located at the same position as that when the user looks at the light emitting elements, but the iris may be located upwardly in the eye in accordance with the directed point. In this case, the eye tracking device 210 may determine where the user looks at on the screen by calculating a distance and an angle between the central point of the eye and the light formed on the eye. The eye tracking device 210 may photograph the eye in the unit of predetermined time or photograph the eye in response to detection of a movement of the eye. Further, the eye tracking device 210 may photograph the eye by detecting the formation of the light emitted by the light emitting elements on the eye.

The eye tracking device 210 may transmit information on a coordinate on the display according to the tracked point of gaze in step 840. The eye tracking device 210 may recognize coordinate information of an upper left part, a lower left part, an upper right part, and a lower right part of the screen. Further, the eye tracking device 210 may analyze and track where the point of eye gaze is located on the screen by analyzing the photographed eye. In general, the movement of the eye may frequently occur, and the eye tracking device 210 may continuously perform a process of photographing the eye and tracking the point of eye gaze through the photographed eye in order to track the point of eye gaze according to the frequent occurrence. Further, the eye tracking device 210 may transmit a result of the eye tracking (for example, coordinate information of the position where the point of eye gaze is currently staying) to the electronic device 220. As described above, the eye tracking device 210 may track the point of eye gaze through the photographed eye, analyze coordinate information of the position of the screen where the tracked point of eye gaze is located, and transmit the analyzed information to the electronic device 220. Further, the eye tracking device 210 may transmit the photographed eye to the electronic device 220.

Figure 9:
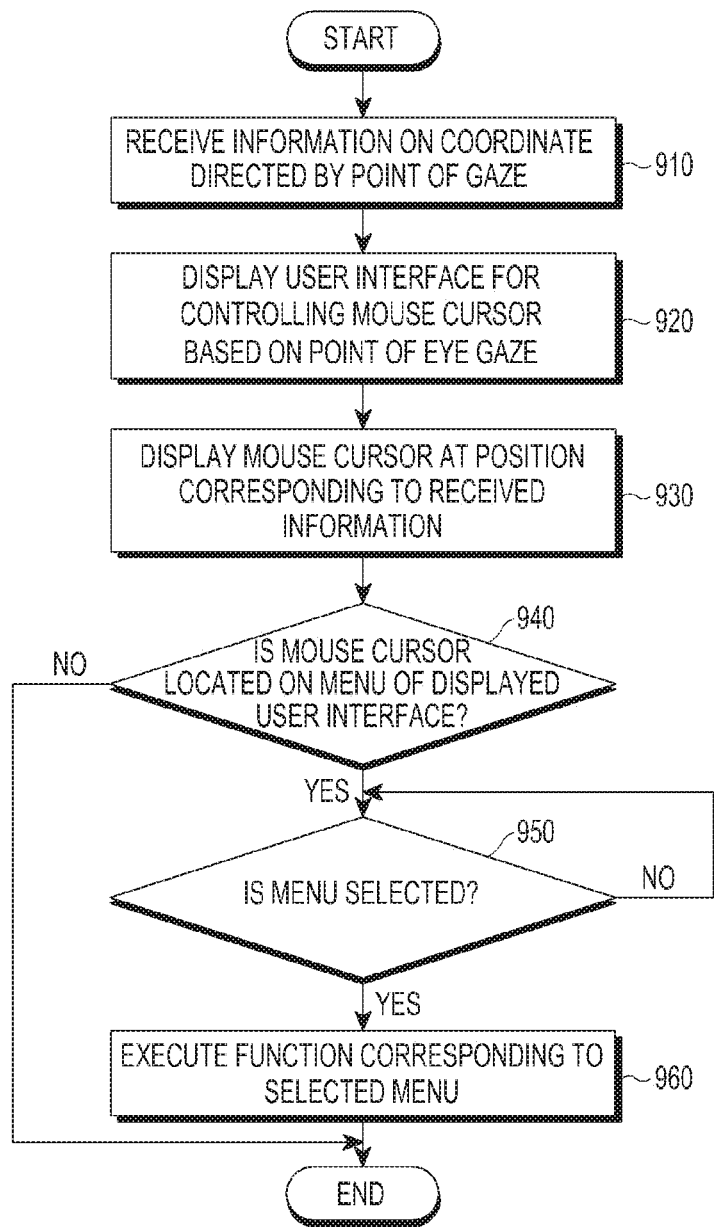
FIG. 9 is a flowchart illustrating a process for controlling a display by tracking the point of eye gaze according to an embodiment of the present invention.

FIG. 9 is a flowchart illustrating a process for controlling a display by tracking the point of eye gaze according to an embodiment of the present invention.

Hereinafter, the process for controlling the display by tracking the point of eye gaze according to the embodiment of the present invention will be described below in detail with reference to FIG. 9.

The electronic device 220 may receive information on a coordinate of a position looked at by the point of gaze in step 910. The electronic device 220 may include an electronic device of which a screen and a main body are connected such as a PC or a notebook, include an integrated electronic device such as a tablet PC or a smart phone, or include a wearable device such as a smart watch or smart glasses that can be worn on the user's body. The electronic device 220 may photograph the eye by the eye tracking device 210, analyze the point of eye gaze through the photographed eye, and receive a location on the screen corresponding to the tracked result according to the movement of the eye. The result may be received according to the movement of the eye or in the predetermined unit of time. As described above, the electronic device 220 may receive the result of the eye tracking (for example, coordinate information on a position where the point of eye gaze is currently staying) from the eye tracking device 210. As described above, the eye tracking device 210 may track the point of eye gaze through the photographed eye, analyze coordinate information of the position of the screen where the tracked point of eye gaze is located, and transmit the analyzed information to the electronic device 220. Further, the eye tracking device 210 may transmit the photographed eye to the electronic device 220.

The electronic device 220 may display a user interface for controlling a mouse cursor based on the point of eye gaze in step 920. The electronic device 220 may display a user interface for controlling a screen through the tracked point of gaze at a predetermined location on the screen 221. The location of the user interface can be changed on the screen 221 and the user interface may be displayed in a circular type or a rectangular type. The user interface may be displayed as a tray icon. The user interface may be displayed on the screen 221 before or after the information on the coordinate is received. The user interface may be automatically executed in response to the tracking of the eye and displayed on the screen 221 or may be executed by an execution command and displayed on the screen 221. The user interface may include a first group having a menu corresponding to at least one function provided by the mouse and a second group having a menu corresponding to at least one function for controlling the display through the point of eye gaze. The first group may include at least one of a menu corresponding to a left click of the mouse, a menu corresponding to a right click of the mouse, a menu corresponding to a left double click of the mouse, a menu corresponding to a drag using the mouse, a menu corresponding to a scroll using the mouse, and a menu corresponding to page switching using the mouse. The second group may include at least one of a menu for activating the user interface, a menu for deactivating the user interface, a menu for setting the user interface, a menu for enlarging an area where the cursor of the mouse is located, a menu for switching between an eye mouse using the point of eye gaze and the normal mouse, a menu for setting a function of the eye mouse, a menu for setting location information of the eye, a menu for a camera view, a menu for setting a short-cut key, a menu for selecting data displayed on the screen, a menu for copying the selected data, a menu for pasting the copied data, and a menu corresponding to a space bar of a keyboard. The menu for setting the user interface may include at least one of a menu for selecting a type of the user interface, a menu for controlling attributes of the eye mouse, a menu for controlling attributes of a camera that photographs the eye, and a menu for providing an additional function of the user interface. When the user interface is in the circular type, the first group may be located at the central part and the second group may be located at the outer part of the first group. Further, when the user interface is in the rectangular type, the first group may be located above the second group. In addition, the user interface may further include at least one of a menu for changing a displayed location and a menu for ending the user interface.

The electronic device may display the mouse cursor at a position corresponding to the received information in step 930. The electronic device 220 may receive information on the coordinate on the display according to the tracked point of gaze from the eye tracking device 210, analyze the received information on the coordinate, and display the mouse cursor at the position corresponding to the received information. The electronic device 220 may determine whether the point of eye gaze is staying on the user interface or staying on a predetermined position of the screen 221 through the received information. The electronic device 220 may determine where the point of eye gaze is staying on through the received information, and display the cursor at the determined position or move the cursor to the determined position. The electronic device 220 may move the cursor of the mouse in real time according to a movement of the point of eye gaze. The electronic device 220 may determine whether the cursor displayed according to the tracked point of gaze is located on a predetermined menu of the user interface. The electronic device 220 may detect an input for selecting a predetermined menu on the user interface. A shape of the cursor may vary depending on a selected menu.

When the mouse cursor is located on the menu of the displayed user interface in step 940 and the menu is selected in step 950, the electronic device 220 may execute a function corresponding to the selected menu. The electronic device 220 may determine whether the mouse cursor is located on the predetermined menu of the user interface. Further, the electronic device 220 may determine if the menu is selected in a state where the cursor is located on the predetermined menu of the user interface. The electronic device 220 may detect an input for selecting the predetermined menu. The input may include at least one of cases where a voice is input, eye blinking is made, and the tracked point of gaze stays for a time longer than a predetermined time. When the electronic device 220 detects at least one of cases where a voice is input, eye blinking is made, and the tracked point of gaze stays for a time longer than a predetermined time, it may be determined that the predetermined menu is selected. The electronic device 220 may maintain the function in an active state to apply the function of the menu selected through the input. When the menu is selected, the electronic device 220 may provide a visual effect (for example, shading processing) to the selected menu or output a voice informing that the menu is selected. The electronic device 220 may output a selection result to allow the user to recognize the selection of the menu through various methods that can be recognized by the user. The electronic device 220 may execute a function corresponding to the selected menu. The electronic device 220 may execute a predetermined menu function at the position where the point of eye gaze is located on the screen 221. When the point of gaze moves to another position and an input is detected at the moved other position after the function corresponding to the selected menu is maintained in the active state, the electronic device 220 may execute a function of the active state at the other position. The input may include at least one of cases where a voice is input, eye blinking is made, and the tracked point of gaze stays for a time longer than a predetermined time. For example, when the point of gaze is located on the menu of the user interface (for example, right click of the mouse) and the input is detected, the electronic device 220 may maintain the function of the menu in a ready state. When the input is detected in a state where the point of gaze moves to another position, the electronic device 220 may execute the function of the menu on the moved position.

Figure 10A:
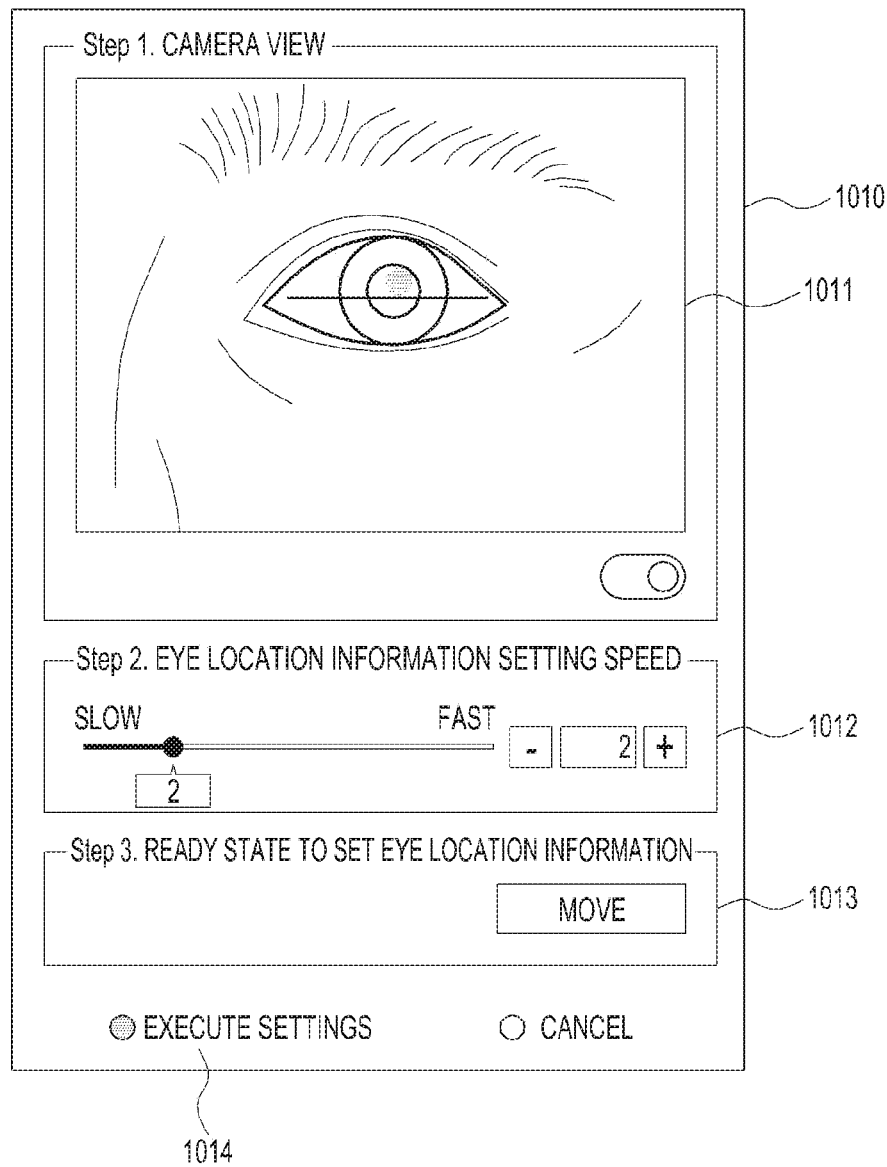
FIG. 10A illustrates an example of a screen for setting location information of the eye according to an embodiment of the present invention.
Figure 10C:
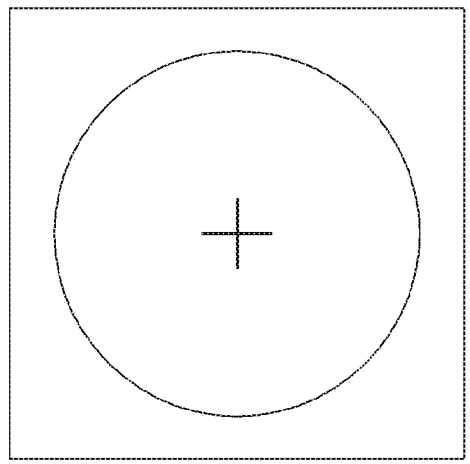
FIG. 10C illustrates an example of preparations for looking at a predetermined position according to an embodiment of the present invention.
Figure 10D:
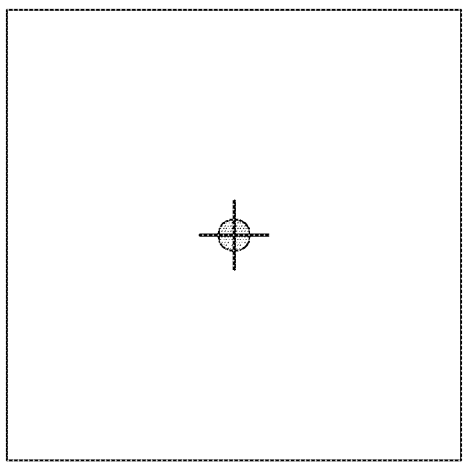
FIG. 10D illustrates an example of a process for recognizing the point of eye gaze according to an embodiment of the present invention.
Figure 10E:
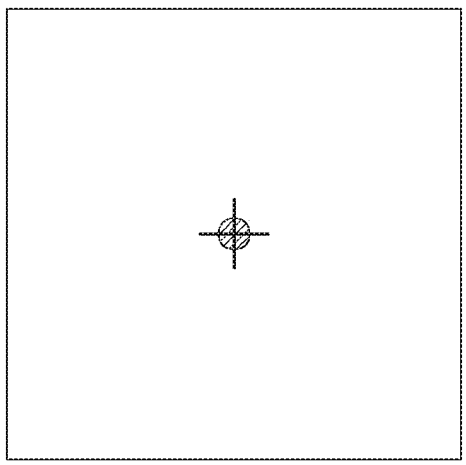
FIG. 10E illustrates an example where recognition of the point of eye gaze is completed according to an embodiment of the present invention.
Figure 10F:
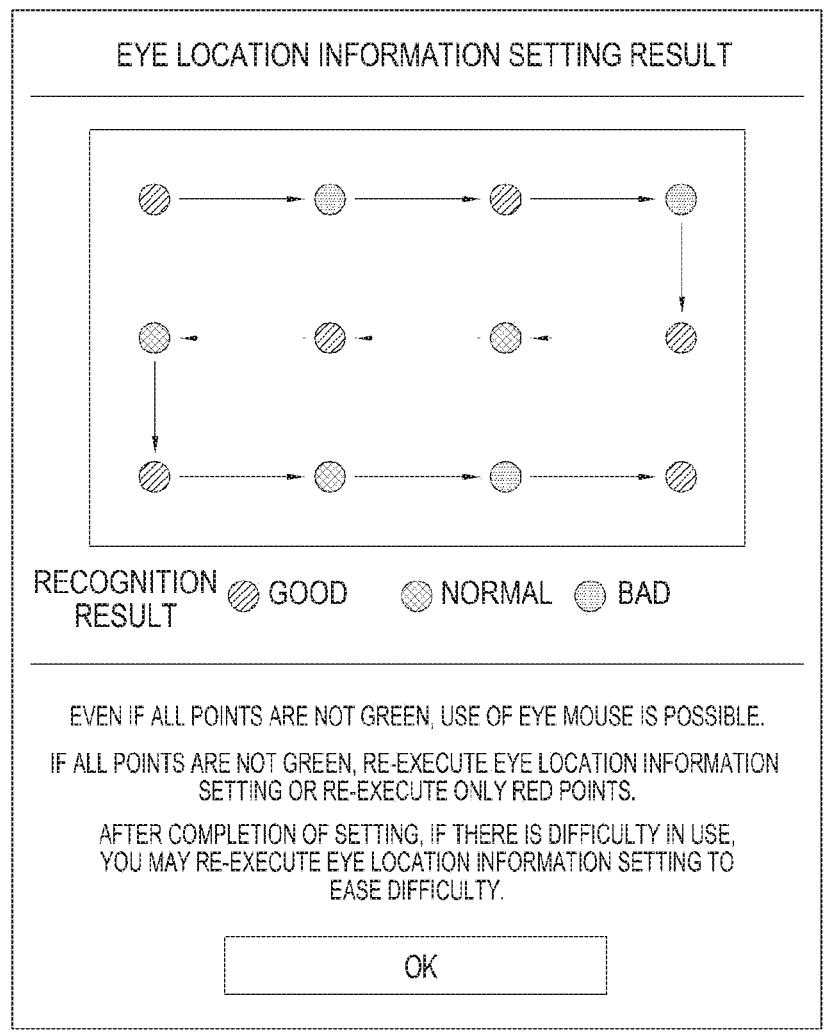
FIG. 10F illustrates an example of a result of eye location information settings according to an embodiment of the present invention.

FIG. 10A illustrates an example of a screen for setting location information of the eye according to an embodiment of the present invention, FIG. 10B illustrates an example of an environment condition of eye location information settings according to an embodiment of the present invention, FIG. 10C illustrates an example of preparations for looking at a predetermined position according to an embodiment of the present invention, FIG. 10D illustrates an example of a process for recognizing the point of eye gaze according to an embodiment of the present invention, FIG. 10E illustrates an example of recognition completion of the point of eye gaze according to an embodiment of the present invention, and FIG. 10F illustrates an example of a result of the eye location information settings according to an embodiment of the present invention.

Referring to FIG. 10A, the screen for setting location information of the eye according to the embodiment of the present invention corresponds to a screen 1010 for first setting location information according to the user's eye in order to control a display through the eye. The screen 1010 may include a first area 1011 for displaying a camera view image to show the eye captured by the camera, a second area 1012 for displaying a speed control for setting eye location information, and a third area 1013 for showing a ready state to set the eye location information. The first area 1011 may display a process for recognizing the eye in real time by photographing the eye through the camera. Through the first area, the user may know if the eye is captured by the camera, and the user may properly place the pupil within a camera view guide to smoothly perform the eye recognition as necessary. The second area 1012 may display a function for controlling a speed at which the eye location information is set and may control the speed at which the eye location is recognized to be slower or faster. Further, the third area 1013 may display a menu for setting the camera when the camera is not focused as illustrated in FIG. 10E described below.

Referring to FIG. 10B, when the requirements for setting the eye location information is completely prepared through FIG. 10A, eye location information settings (calibration) may be executed. Through FIG. 10B, the mouse cursor may move in a direction directed by the eye based on a calculation of a relation between a location which the user's eye looks at and a location on the screen. First, a distance between a monitor (for example, the screen) and the eye may be calculated. According to a condition of the distance between the monitor and the eye, the eye is focused on the first area 1011 of FIG. 10A and the eye location guide is turned, and thus the location of the eye can be identified. Such a condition may include at least one of a size of the monitor (for example, the screen), a resolution of the monitor, and a distance from the eye. Further, the speed in the eye location information settings may be controlled. In a setting process, a spent time may be selected by controlling the measurement speed to be faster. Further, the eye location information settings may be executed. For example, when the eye location information settings are executed and a green signal is turned on, the execution is possible. However, when the green signal is not turned on, the process for calculating the distance between the monitor (for example, the screen) and the eye should be performed again. When such a process is accurately performed, the user interface for controlling the display based on the point of eye gaze can be sufficiently used.

Referring to FIGS. 10C to 10F, when the eye location information settings are executed, a screen for the gaze at a predetermined position may be displayed as illustrated in FIG. 10C and the point of eye gaze may be recognized as illustrated in FIG. 10D. During the recognition of the point of eye gaze, the focus (for example, a red point) is formed as illustrated in FIG. 10D and, when the recognition of the point of eye gaze is completed, the focus (for example, a green point) may be formed as illustrated in FIG. 10E. When the process of FIGS. 10C to 10E is completed, an eye location information setting result may be displayed as illustrated in FIG. 10F. When the eye location information settings are completed, a grid in the shape of a checkerboard appears, and the eye location information settings are progressed as the point is sequentially displayed starting at the upper left grid. When the point is displayed in the grid, the user may look at the corresponding point. The point may be displayed as green when the user's eye is accurately recognized and thus a result is good, the point may be displayed as yellow when the recognition is normal, and the point may be displayed as red when the recognition is bad. The eye location information settings may be performed once or more. Alternatively, the eye location information settings may be partially re-executed. Further, when the eye location information settings are completed, a user interface for recognizing the eye may be used.

Figure 11A:
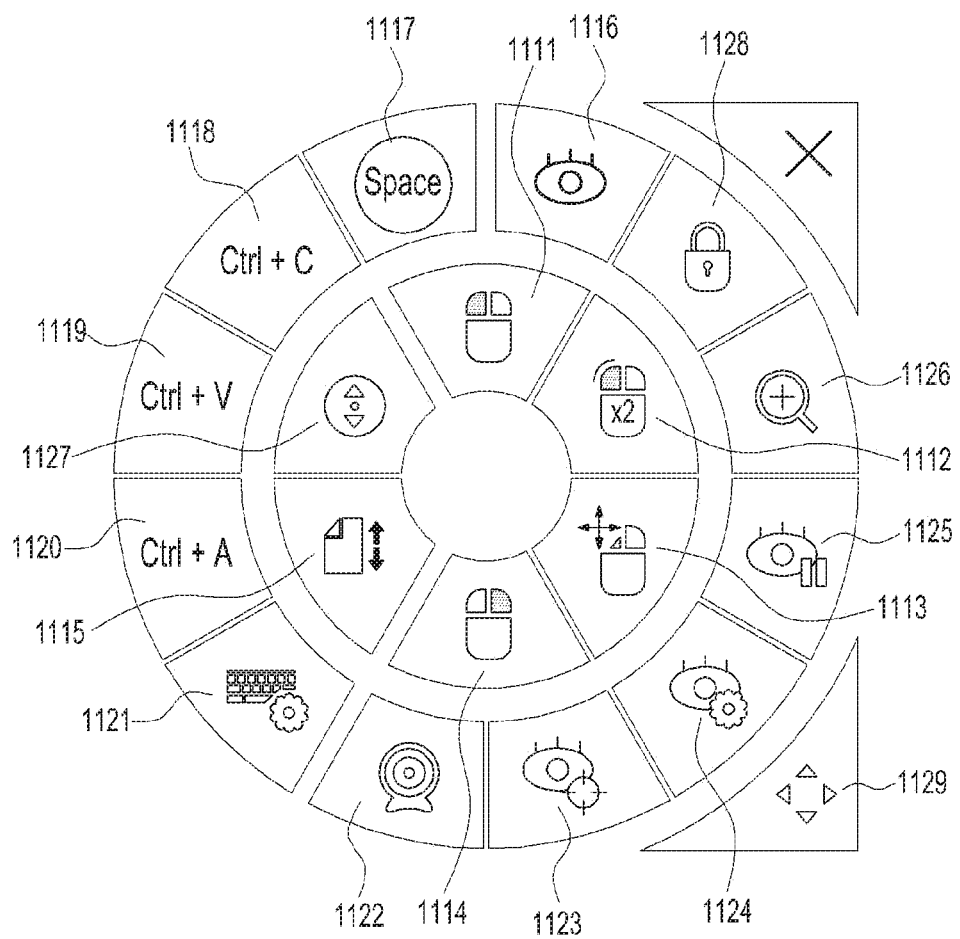
FIG. 11A illustrates an example of a circular type user interface according to an embodiment of the present invention.
Figure 11B:
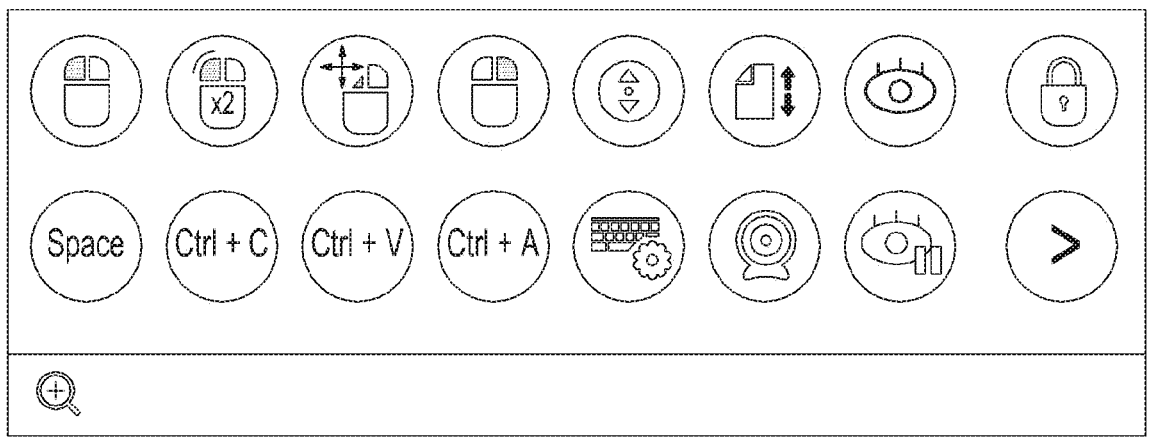
FIG. 11B illustrates an example of a rectangular type user interface according to an embodiment of the present invention.

FIG. 11A illustrates an example of a user interface in a circular type according to an embodiment of the present invention, and FIG. 11B illustrates an example of a user interface in a rectangular type according to an embodiment of the present invention.

Referring to FIGS. 11A and 11B, locations of the user interfaces according to the embodiment of the present invention can be changed on the screen 221, and may be displayed in a circular type or a rectangular type. The user interface may be displayed as a tray icon. The user interface may be automatically executed in response to the tracking of the eye and displayed on the screen 221 or may be executed by an execution command and displayed on the screen 221. For example, when the user interface is executed by an execution command, the eye tracking may be performed after the user interface is executed. The user interface may include a first group having a menu corresponding to at least one function provided by the mouse and a second group having a menu corresponding to at least one function for controlling the display through the point of eye gaze. The first group may include at least one of a menu 1111 corresponding to a left click of the mouse, a menu 1114 corresponding to a right click of the mouse, a menu 1112 corresponding to a left double click of the mouse, a menu 1113 corresponding to a drag using the mouse, a menu 1115 corresponding to a scroll using the mouse, and a menu 1127 corresponding to page switching using the mouse. The second group may include at least one of a menu 1116 for executing the user interface to control the display through the point of eye gaze, a menu 1128 for deactivating the user interface, a menu 1126 for enlarging an area where the cursor of the mouse is located, a menu 1125 for switching between an eye mouse using the point of eye gaze and the normal mouse, a menu 1124 for setting a function of the eye mouse, a menu 1123 for setting location information of the eye, a menu 1122 for a camera view, a menu 1121 for setting a short-cut key, a menu 1120 for selecting data displayed on the screen, a menu 1118 for copying the selected data, a menu 1119 for pasting the copied data, and a menu 1117 corresponding to a space bar of a keyboard. Further, the user interface may further include a menu 1129 for changing the displayed location. The user interface according to an embodiment of the present invention may include various functions that may be input or executed using a keyboard or the mouse as well as the various menus.

A function designated to the menu 1111 corresponding to the left click of the mouse in the first group performs, as a basic operation, an operation of, when the mouse cursor is moved by the eye and then an input (for example, a voice, eye blinking, or gaze for a predetermined time) is generated, clicking the left side of the mouse on the moved position. A function designated to the menu 1114 corresponding to the right click of the mouse performs, as a basic operation, an operation of, when the mouse cursor is moved by the eye and then an input (for example, a voice, eye blinking, or gaze for a predetermined time) is generated, clicking the right side of the mouse on the moved position. A function designated to the menu 1112 corresponding to the left double click of the mouse performs, as a basic operation, an operation of, when the mouse cursor is moved by the eye and then an input (for example, a voice, eye blinking, or gaze for a predetermined time) is generated, double-clicking the left side of the mouse. A function designated to the menu 1113 corresponding to the drag using the mouse performs the drag when the input is made in a state where the menu 1113 is selected and then the cursor moves according to a movement of the eye. When an input is generated again, the function corresponding to the menu 1113 may be released. A function designated to the menu 1115 corresponding to the scroll using the mouse activate a scroll reference point when the menu 1115 is selected and an input (for example, a voice, eye blinking, or gaze for a predetermined time) is generated while the user is looking at an area to be scrolled. When the user looks upwardly based on the reference point, an upward scroll is performed. When the user looks downwardly, a downward scroll is performed. A function designated to the menu 1127 corresponding to the page switching using the mouse activates a reference point for paging switching when the menu 1127 is selected and an input (for example, a voice, eye blinking, or gaze for a predetermined time) is generated while the user is looking at an area to which the user desires to move the page. When the input is made while the user looks upwardly based on the reference point, the page switches upwardly. When the input is made while the user looks downwardly, the page switches downwardly. The locations of the menus included in the first group may be variably controlled.

A function 1116 for executing the user interface to control the display based on the point of eye gaze in the second group corresponds to a function for activating or executing the user interface. A function designated to the menu 1128 for deactivating the user interface corresponds to a function for ending the use of the user interface for controlling the display based on the point of eye gaze or maintaining the user interface in a lock state. A function designated to the menu 1126 for enlarging the area where the mouse cursor is located corresponds to a function for enlarging a predetermined area based on the position where the cursor is located. A function designated to the menu 1125 for switching between the eye mouse using the point of eye gaze and the normal mouse corresponds to a function for controlling the display based on the point of eye gaze or controlling the display through the normal mouse. A function designated to the menu 1124 for setting the function of the eye mouse corresponds to a function for setting a function of the screen, the mouse, and the camera and, adding various functions. A function designated to the menu 1123 for setting the location information of the eye corresponds to a function for accurately recognizing or setting the location of the eye. A function designated to the menu 1122 for the camera view corresponds to a function for setting the camera to more accurately recognize the eye. A function designated to the menu 1121 for setting the short-cut key corresponds to a function for designating a mainly used function to a predetermined keyboard. A function designated to the menu 1120 for selecting the data displayed on the screen corresponds to a function for selecting data like pressing Ctrl+A on the keyboard, a function designated to the menu 1118 for copying the selected data corresponds to a function for copying the selected data like pressing Ctrl+C, and a function designated to the menu 1119 for pasting the copied data corresponds to a function for pasting the copied data like pressing Ctrl+V. Further, a function designated to the menu 1117 corresponding to the space bar of the keyboard corresponds to a function for clicking the space bar on the keyboard.

When the user interface is in the circular type, the first group may be located at the central part and the second group may be located outside the first group as illustrated in FIG. 11A. Further, when the user interface is in the rectangular type, the first group may be located above the second group as illustrated in FIG. 11B. In addition, the user interface may further include at least one of a menu for changing a displayed location and a menu for ending the user interface. The menu 1124 for setting the user interface may include at least one of a menu for selecting a type of the user interface, a menu for controlling attributes of the eye mouse, a menu for controlling attributes of the camera that photographs the eye, and a menu for providing an additional function of the user interface.

[Table 1] below shows mouse pointer images according to an embodiment of the present invention.

TABLE 1

| Mouse pointer images | Mouse operation names |
|---|---|
|  | Left click |
|  | Right click |
|  | Left double click |
|  | Drag |
|  | Scroll |
|  | Page |
|  | Short-cut key execution |

As shown in [Table 1], the left part of the mouse pointer may be displayed as yellow in a case of the left click, the right part of the mouse pointer may be displayed as yellow in a case of the right click, the left part of the mouse pointer may be overlappingly displayed as yellow in a case of the left double click, "+" may be displayed at the center of the mouse pointer in a case of the drag, arrows may be displayed on upper and lower parts based on the center of the mouse pointer in a case of the scroll, and "+" may be displayed on upper and lower right parts of the page in a case of the page.

Figure 12A:
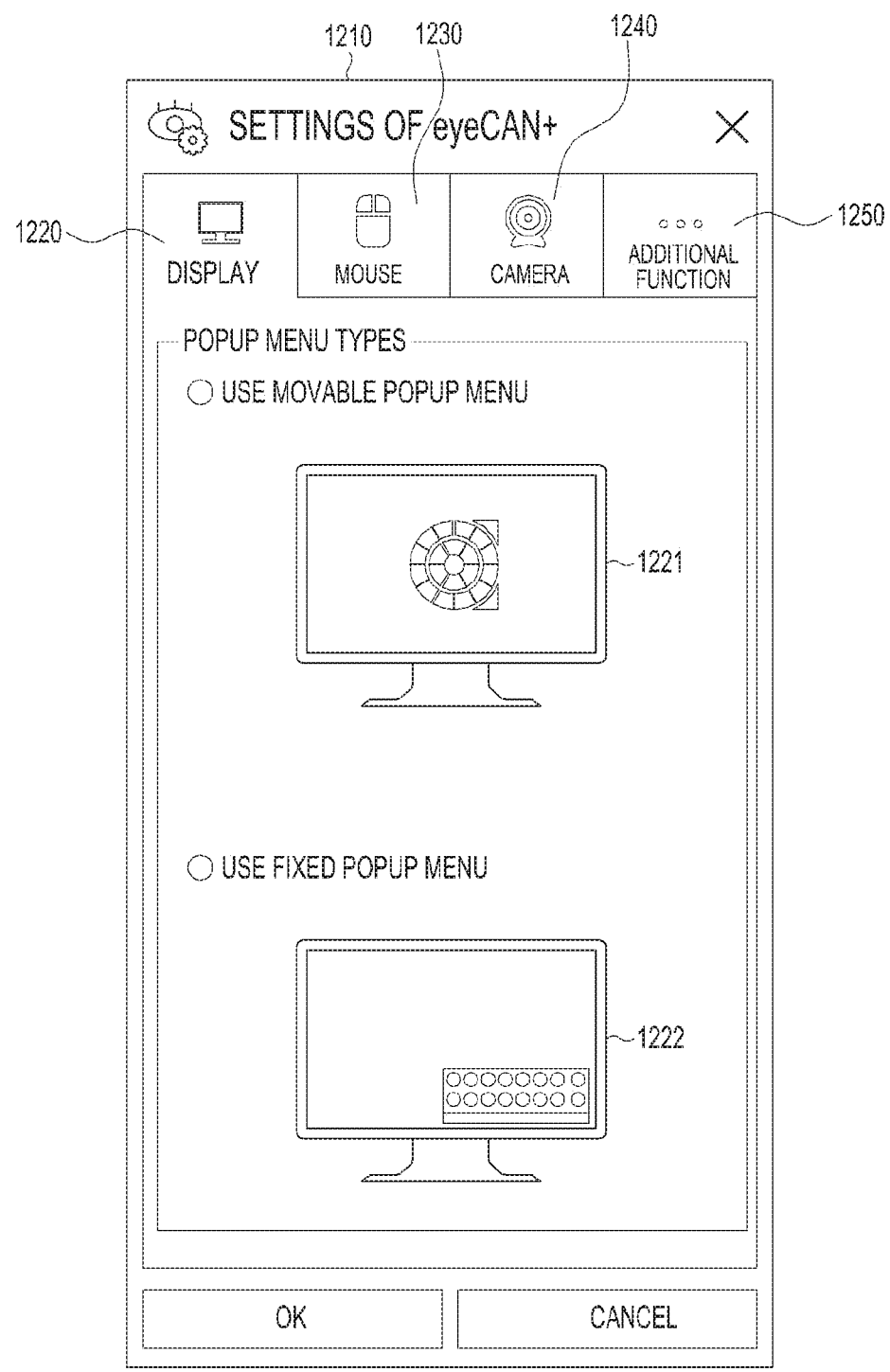
FIG. 12A illustrates an example for selecting a user interface displayed on a screen in a menu for setting the user interface according to an embodiment of the present invention.
Figure 12B:
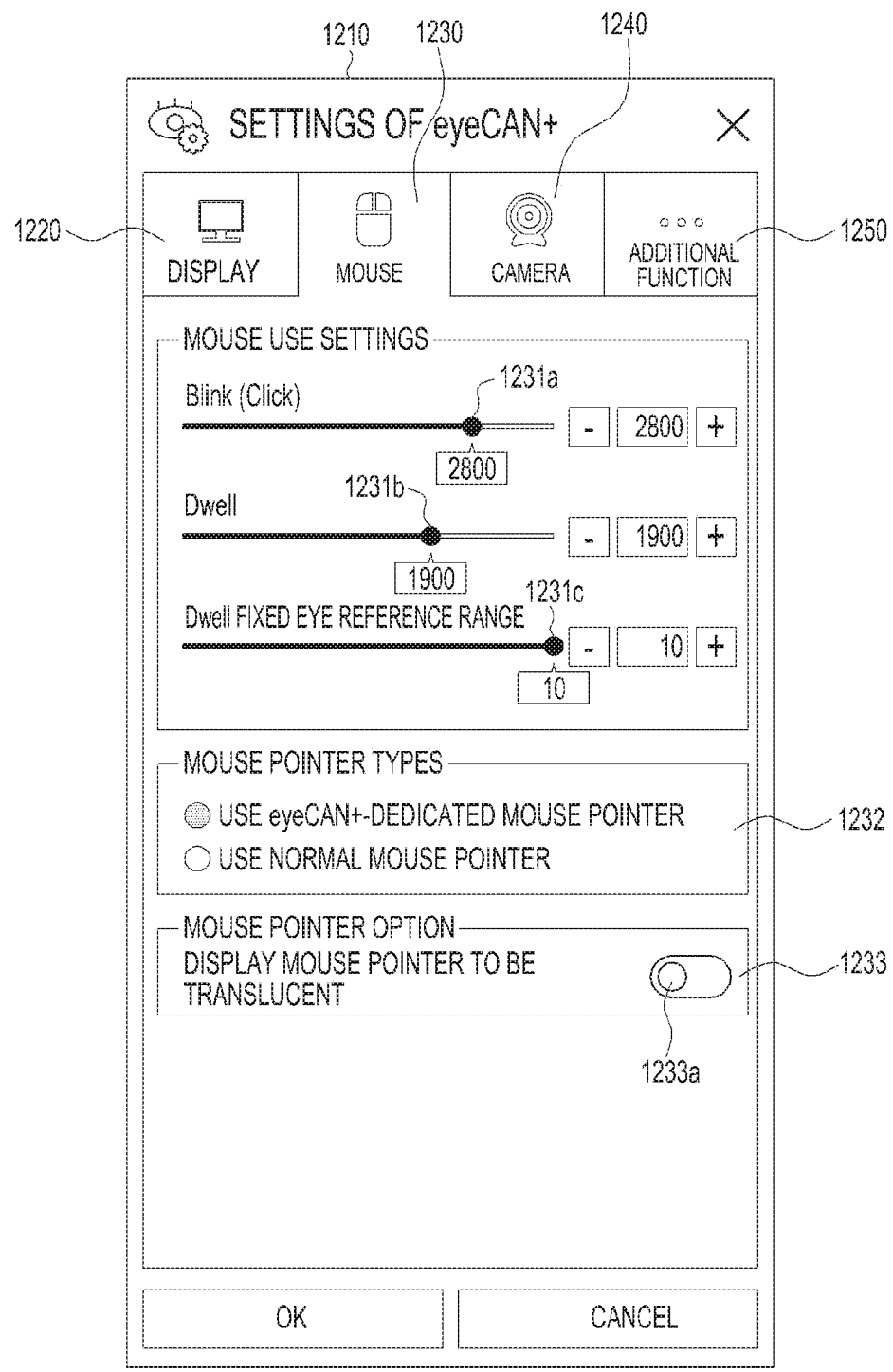
FIG. 12B illustrates an example for setting a mouse in a menu for setting the user interface according to an embodiment of the present invention.
Figure 12C:
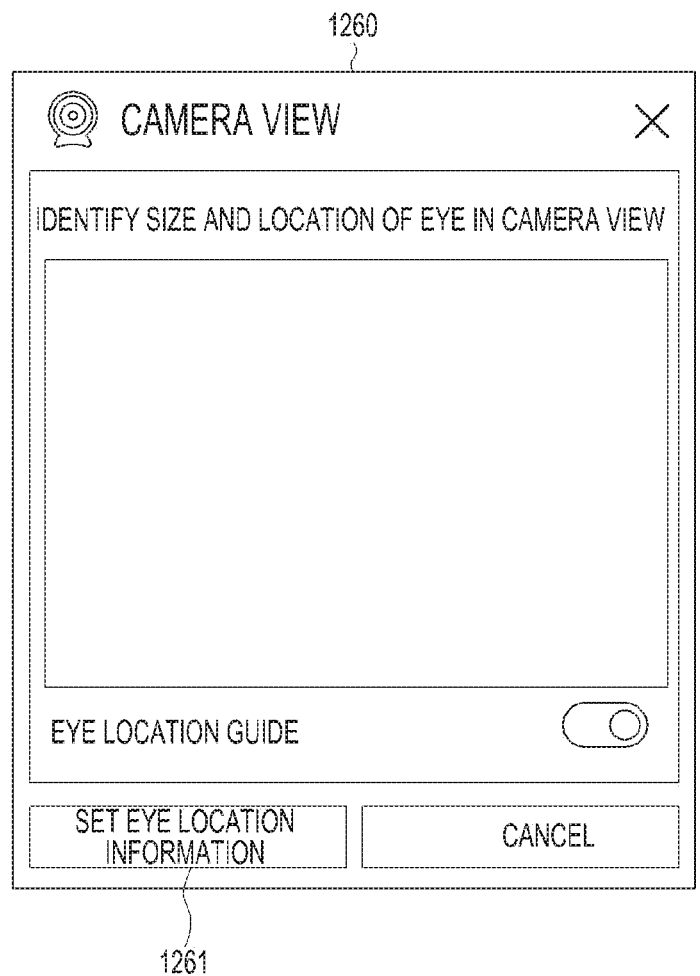
FIG. 12C illustrates an example for a camera view in a menu for setting the user interface according to an embodiment of the present invention.
Figure 12D:
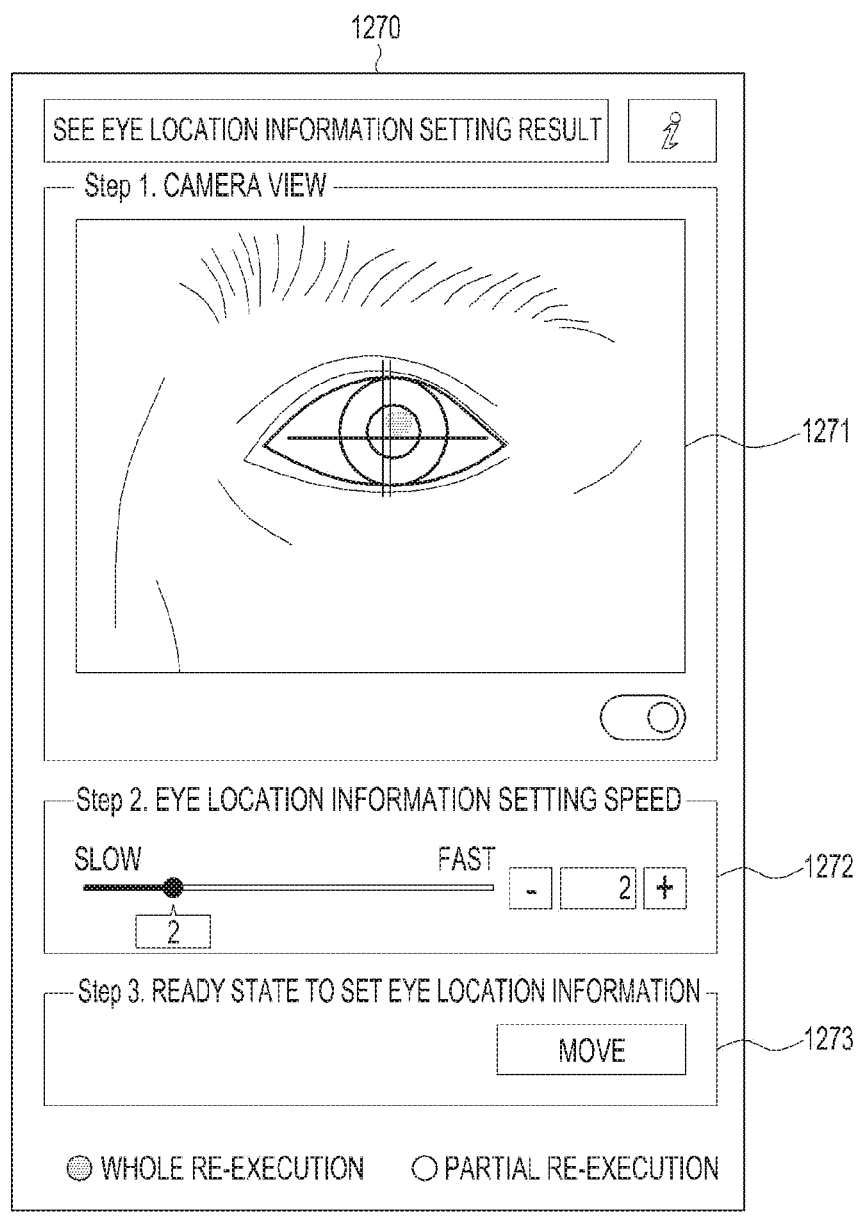
FIG. 12D illustrates an example of a result of eye location information settings in the camera view of the menu for setting the user interface according to an embodiment of the present invention.
Figure 12E:
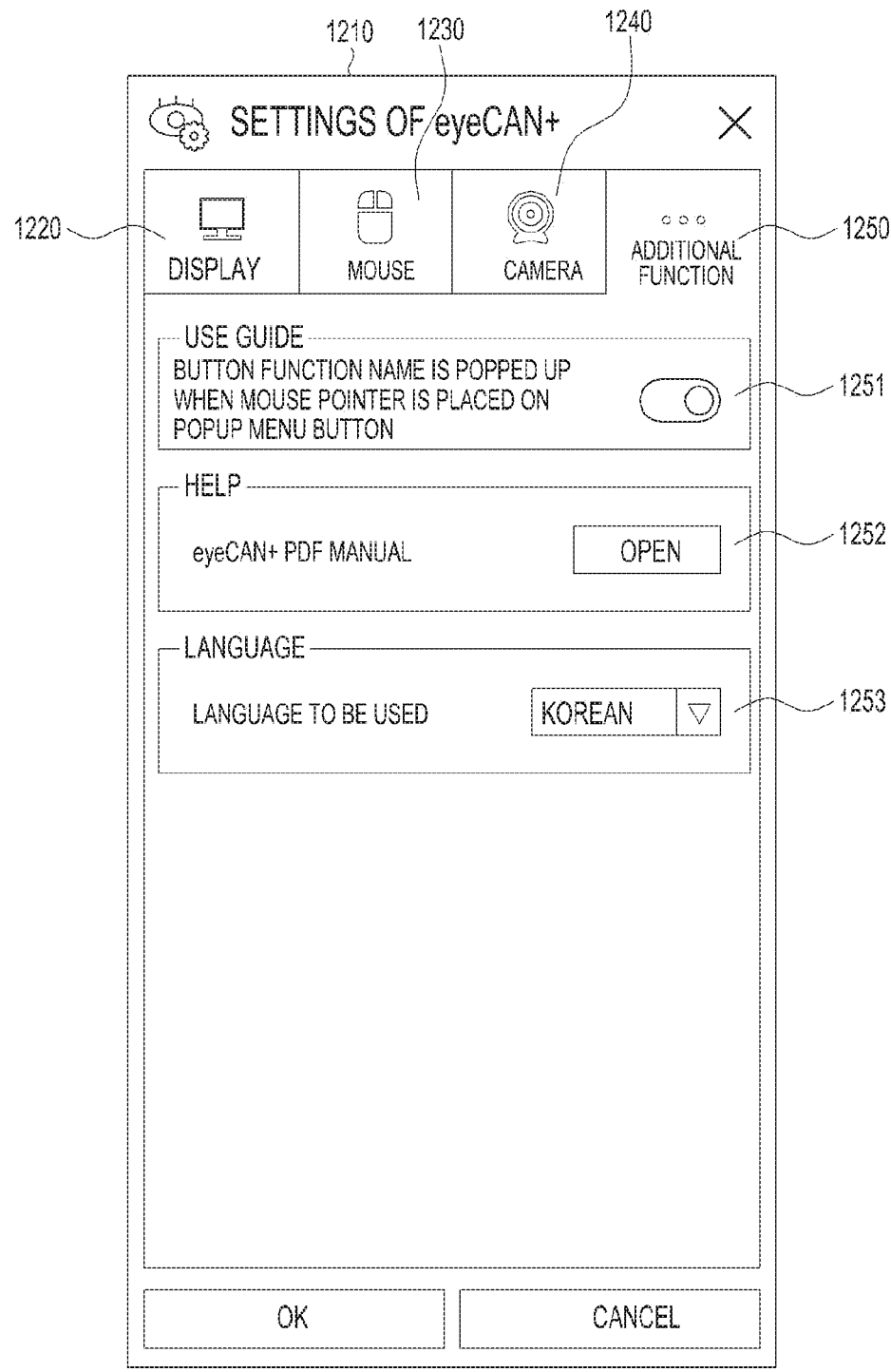
FIG. 12E illustrates an example for applying an additional function in the menu for setting the user interface according to an embodiment of the present invention.
Figure 12F:
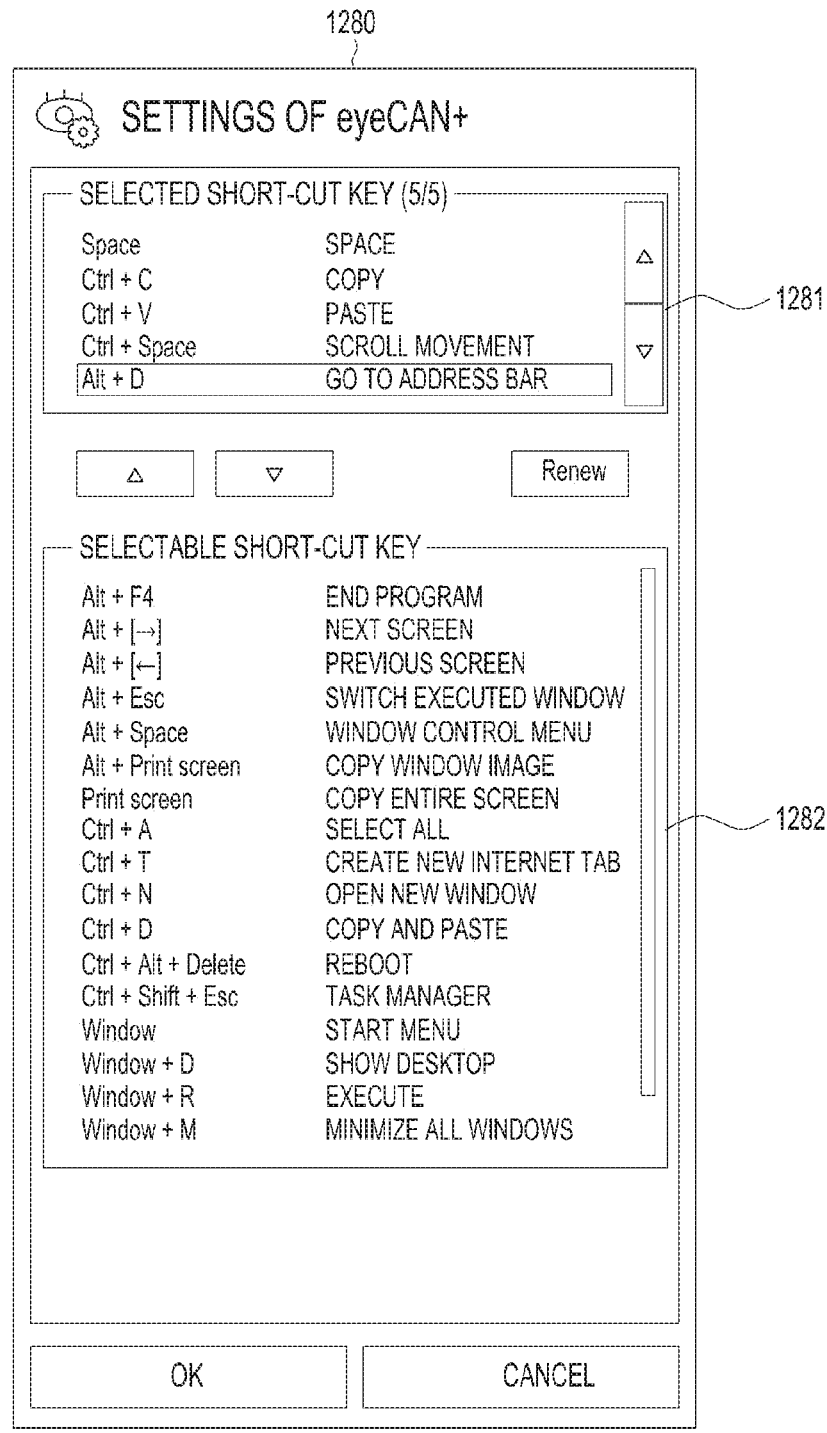
FIG. 12F illustrates an example for setting a short-cut key in the menu for setting the user interface according to an embodiment of the present invention.

FIG. 12A illustrates an example for selecting a user interface displayed on the screen in menus for setting the user interface according to an embodiment of the present invention, FIG. 12B illustrates an example for setting the mouse in menus for setting the user interface according to an embodiment of the present invention, FIG. 12C illustrates an example of a camera view in menus for setting the user interface according to an embodiment of the present invention, FIG. 12D illustrates an example of a setting result of location information of the eye in the camera view of the user interface setting menus according to an embodiment of the present invention, FIG. 12E illustrates an example for applying an additional function in menus for setting the user interface according to an embodiment of the present invention, and FIG. 12F illustrates an example for setting short-cut keys in menus for setting the user interface according to an embodiment of the present invention.

Referring to FIG. 12A, a screen 1210 for setting the user interface may include a display menu 1220, a mouse menu 1230, a camera menu 1240, and an additional function menu 1250. The display menu 1220 may display various types of user interfaces to determine a type of the user interface displayed on the screen and the user may select or set a predetermined user interface. The display menu 1220 may include a circular type user interface 1221 and a rectangular type user interface 1222. A location or size of each of the user interfaces may be changed on the screen.

Referring to FIG. 12B, when the mouse menu 1230 is selected on the screen 1210 for setting the user interface, a mouse use setting screen 1231, a mouse pointer type screen 1232, and a mouse pointer option screen 1233 are displayed.

The mouse use setting screen 1231 corresponds to a screen for setting an input according to an embodiment of the present invention and may set detailed matters of the eye operation to execute the mouse function through the eye and a movement of the mouse pointer. The mouse use setting screen 1231 may control a level at which the eye blinking can be recognized through a control of a first icon 1231*a*, set a time for determining an input when the gaze stays at one position through a control of a second icon 1231*b*, and set a fixed reference range within which the gaze stays at one position through a control of a third icon 1231*c*. The mouse pointer type screen 1232 may set the use of a user interface (for example, eyeCAN+)-dedicated mouse pointer or a normal mouse pointer. The mouse pointer option screen 1233 corresponds to a screen for controlling transparency of the mouse pointer and may control the transparency by controlling a fourth icon 1233*a*.

Referring to FIG. 12C, when the camera menu 1240 is selected on the screen 1210 for setting the user interface, a camera view 1260 is displayed. The camera view 1260 is photographed through the current camera and an image displayed as the camera view. By displaying the photographed image, an eye location guide may be activated and an eye guide may be displayed to identify a proper location of the eye. Further, by selecting an eye location information setting button 1261, an eye location information setting process may be performed.

Referring to FIG. 12D, a screen 1270 for setting location information of the eye according to an embodiment of the present invention corresponds to a screen for first setting location information according to the user's eye in order to control the display through the eye. The screen 1270 may include a first area 1271 for displaying an image photographed by the camera, a second area 1272 for displaying a speed control to set eye location information, and a third area 1273 for showing a ready state to set the eye location information. The first area 1271 may display a process for recognizing the eye in real time by photographing the eye through the camera. Through the first area, the user may know if the eye is captured by the camera, and the user may properly place the pupil within a camera view guide to smoothly perform the eye recognition as necessary. The second area 1272 may display a function for controlling a speed at which the eye location information is set and may control the speed at which the eye location is recognized to be slower or faster. The third area 1273 may display a menu for setting the camera when the camera is not focused. Whole re-execution on the screen 1271 may correspond to re-execution of the entire eye location information setting process from the beginning and partial re-execution may correspond to execution of the eye location information setting process from a part in which the eye location information settings are not correctly performed.

Referring to FIG. 12E, when an additional function menu 1250 is selected on the screen 1210 for setting the user interface, a use guide screen 1251, a help providing screen 1252, and a language screen 1253 are displayed. The use guide screen 1251 corresponds to a screen for setting a function for displaying a button function name through a popup when the mouse pointer is located on a popup menu button. The help providing screen 1252 corresponds to a screen for displaying a manual of the user interface, and the language screen 1253 corresponds to a screen for selecting a language used in the user interface.

Referring to FIG. 12F, as the short-cut keys on the user interface according to an embodiment of the present invention, various short-cut keys may be set according to user's taste as well as the menu 1120 for selecting data, the menu 1118 for copying the selected data, the menu 1119 for pasting the copied data, and the menu 1117 corresponding to the space bar of the keyboard. As illustrated in FIG. 12F, a screen 1280 for setting the various short-cut keys may be preset or may include a screen 1281 for showing selected short-cut keys and a screen 1282 for showing selectable short-cut keys. As described above, short-cut keys selected from the selectable short-cut keys may be moved to the screen 1281.

Figure 13A:
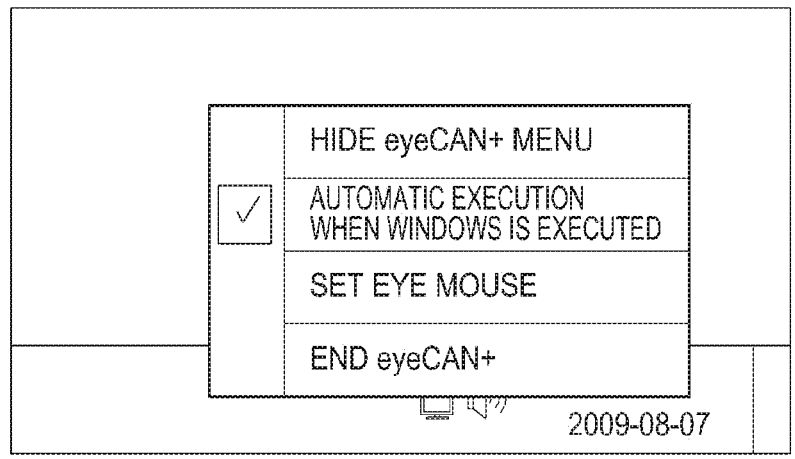
FIG. 13A illustrates an example of a state where a popup menu is shown through a hide function according to a right click of the mouse on the screen according to an embodiment of the present invention.
Figure 13B:
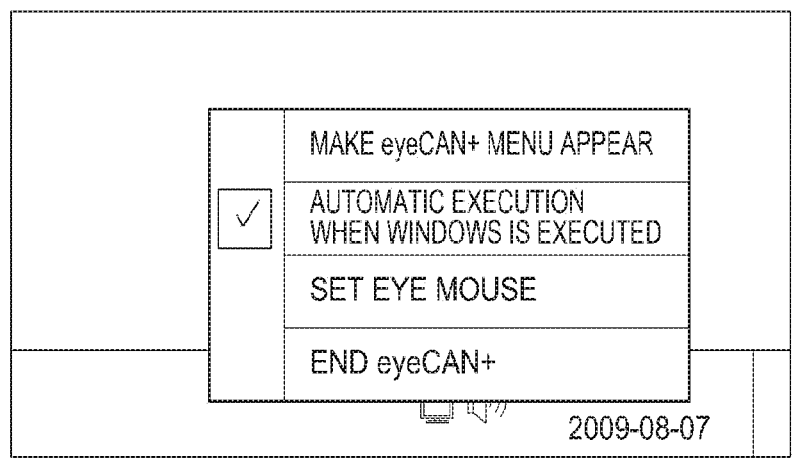
FIG. 13B illustrates an example of a state where a popup menu is hidden through a hide function according to a right click of the mouse on the screen according to an embodiment of the present invention.

FIG. 13A illustrates an example of a state where a popup menu is shown through a hiding function according to a right click of the mouse on the screen according to an embodiment of the present invention, and FIG. 13B illustrates an example of a state where a popup menu is hidden through a hiding function according to a right click of the mouse on the screen according to an embodiment of the present invention.

Referring to FIGS. 13A and 13B, user interface (for example, eye CAN+) menu hiding corresponds to a function for hiding the popup menu when the menu is selected, and automatic execution when Windows is executed corresponds to a function for automatically executing the user interface when Windows starts. Further, when the menu is selected through the right click of the mouse, eye mouse settings provided through an eye mouse setting popup and the user interface may end.

Figure 14A:
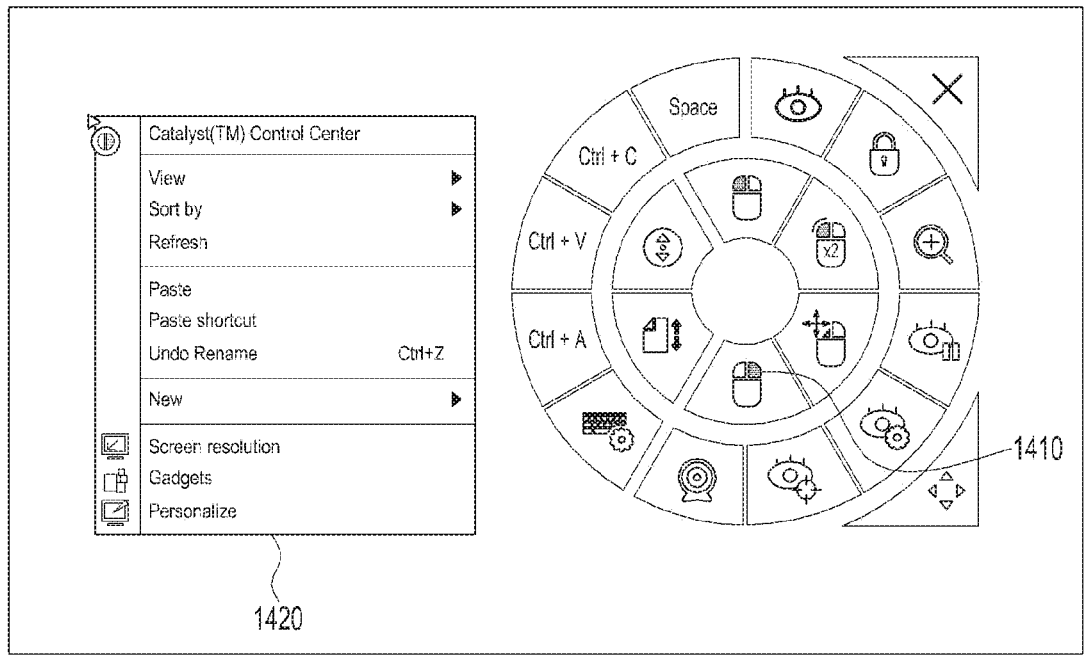
FIG. 14A illustrates an example for activating a right click menu according to a signal input by gazing the screen according to an embodiment of the present invention.
Figure 14B:
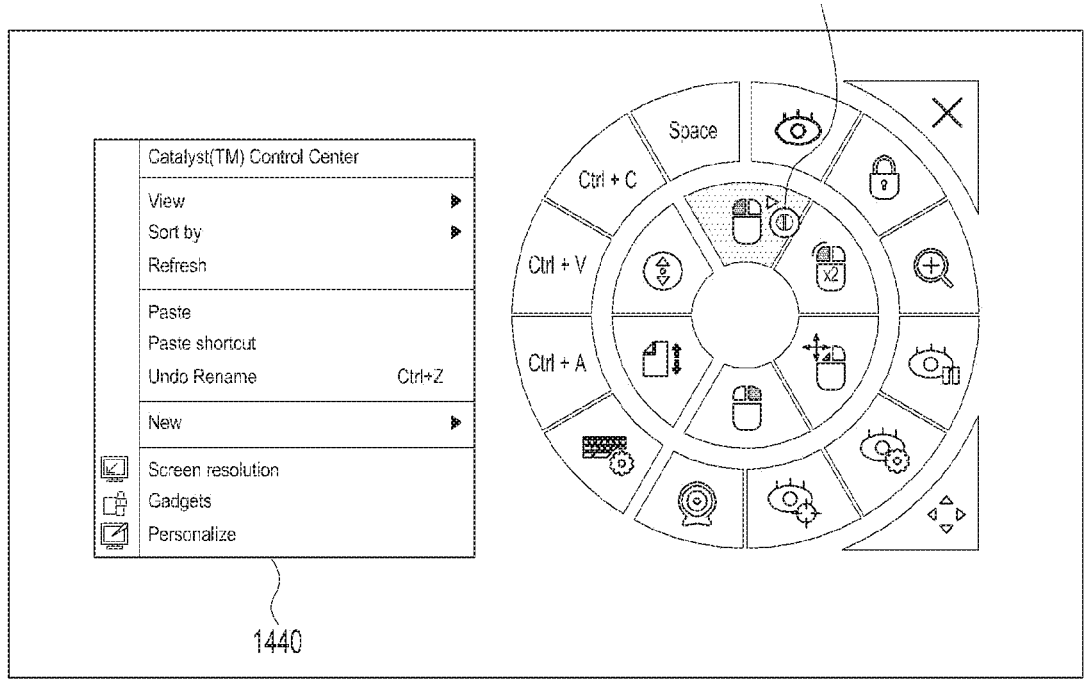
FIG. 14B illustrates an example for selecting a left click mouse operation according to a signal input signal by gazing a left click button of the popup menu.
Figure 14C:
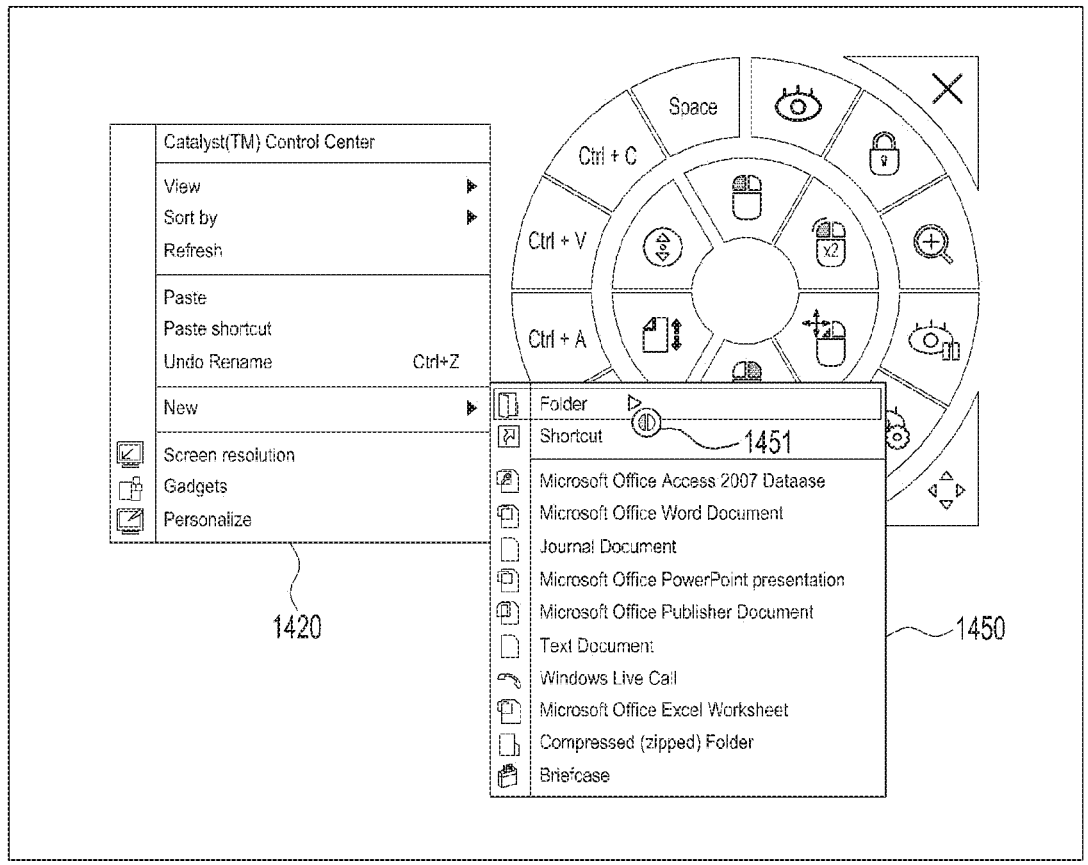
FIG. 14C illustrates an example of execution by an input signal through the gaze of a new folder menu in a state where the right click menu is activated according to an embodiment of the present invention
Figure 14D:
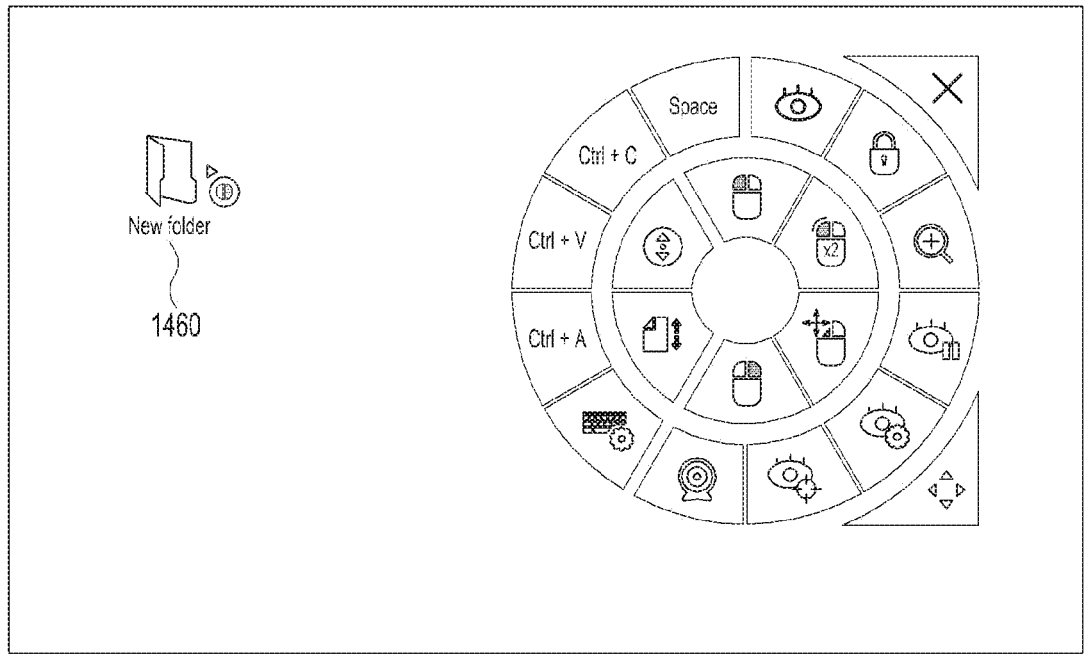
FIG. 14D illustrates an example for generating a new folder by an input signal through the gaze of the new folder menu in the state where the right click menu is activated according to an embodiment of the present invention.
Figure 14E:
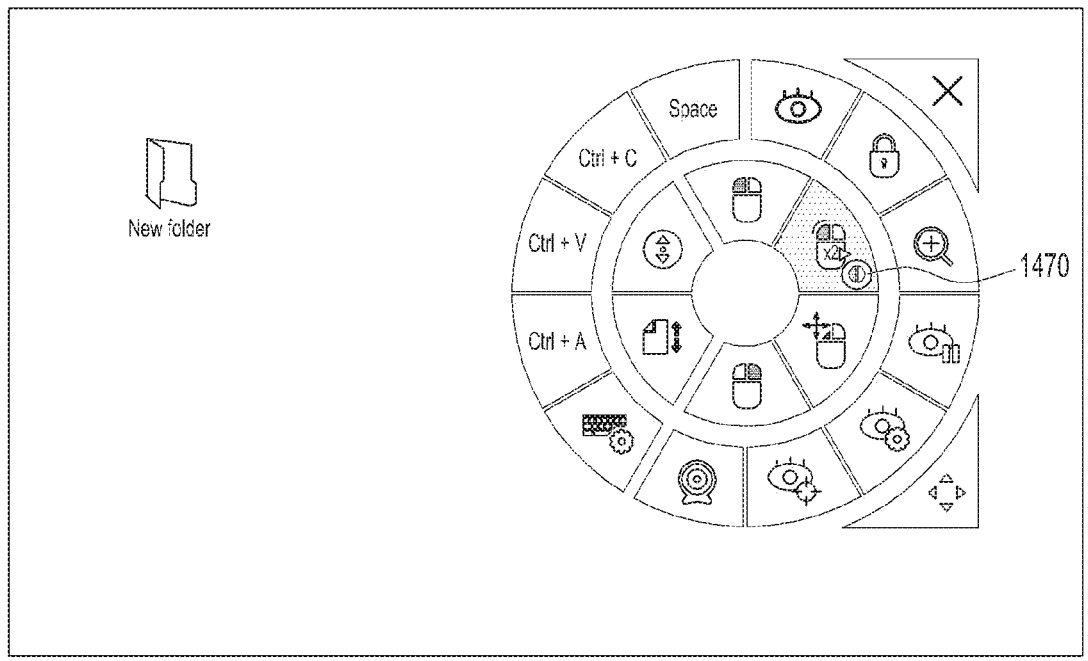
FIG. 14E illustrates an example for selecting a left double click menu on the user interface for the new folder generated on the screen according to an embodiment of the present invention.
Figure 14F:
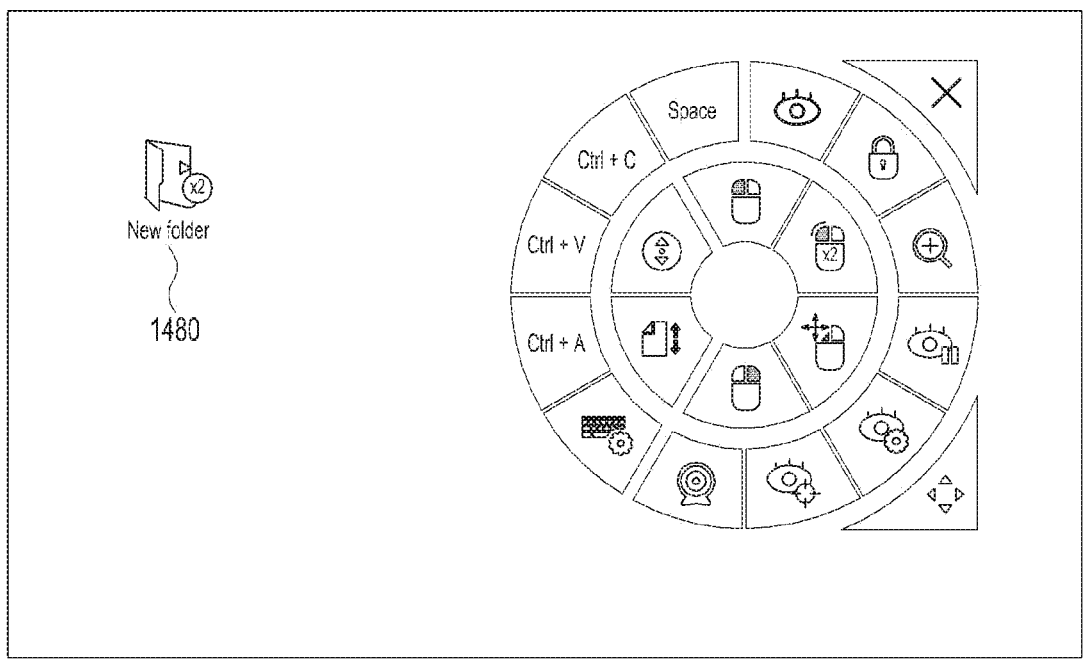
FIG. 14F illustrates an example for moving the mouse cursor to the new folder by gazing at the new folder after the left double click menu is selected according to an embodiment of the present invention.
Figure 14G:
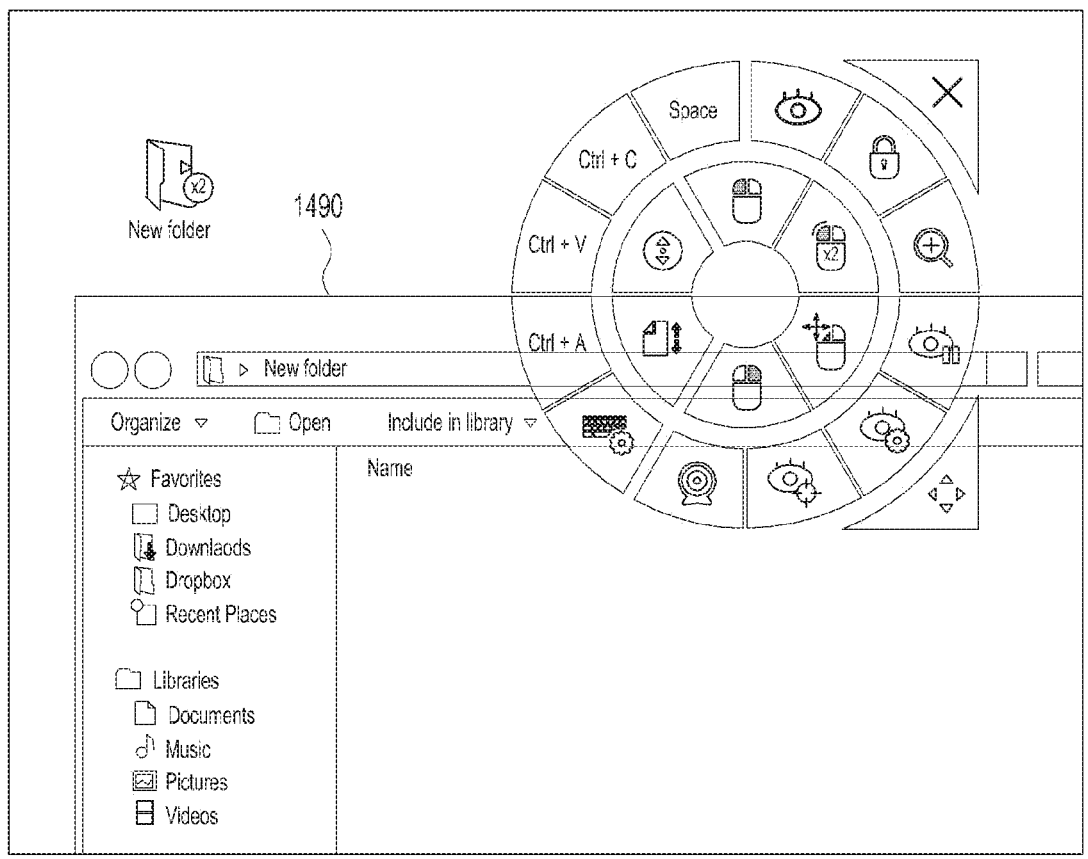
FIG. 14G illustrates an example for applying the left double click to the new folder according to an embodiment of the present invention.

FIG. 14A illustrates an example for activating a right click menu according to a signal input by gazing at the screen according to an embodiment of the present invention, FIG. 14B illustrates an example for selecting a left click mouse operation according to a signal input by gazing at a left click button of the popup menu, FIG. 14C illustrates an example of execution by an input signal through the gaze of a new folder menu in a state where the right click menu is activated according to an embodiment of the present invention, FIG. 14D illustrates an example for generating a new folder by an input signal through the gaze of the new folder menu in the state where the right click menu is activated according to an embodiment of the present invention, FIG. 14E illustrates an example for selecting a left double click menu on the user interface for the new folder generated on the screen according to an embodiment of the present invention, FIG. 14F illustrates an example for moving the mouse cursor to the new folder by gazing at the new folder after the left double click menu is selected according to an embodiment of the present invention, and FIG. 14G illustrates an example for applying the left double click to the new folder according to an embodiment of the present invention.

Referring to FIGS. 14A to 14G, when the right click 1410 of the mouse is selected on the user interface, a popup 1420 for selecting various functions according to the right click is displayed. Referring to FIG. 14B, when the left click 1430 of the mouse is selected on the user interface, a popup 1440 for selecting various functions according to the left click is displayed. Referring to FIG. 14C, when a function (for example, New) for generating a new folder is selected in the popup 1420 of FIG. 14A, a popup 1450 including various functions for generating the new folder is displayed. When a folder function 1451 is selected in the popup 14450, a new folder 1460 is generated on the screen as illustrated in FIG. 14D. In order to open the generated new folder, a left double click menu 1470 is selected on the user interface as illustrated in FIG. 14E and, when an input is made in a state where the user looks at the generated folder 1480 as illustrated in FIG. 14F, the generated folder is executed as illustrated in FIG. 14G.

Figure 15A:
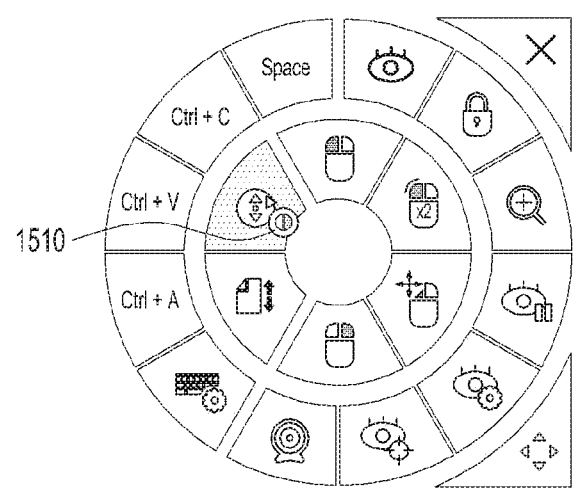
FIG. 15A illustrates an example for selecting a menu corresponding to a scroll on the user interface in order to scroll an Internet screen through the mouse according to an embodiment of the present invention.
Figure 15B:
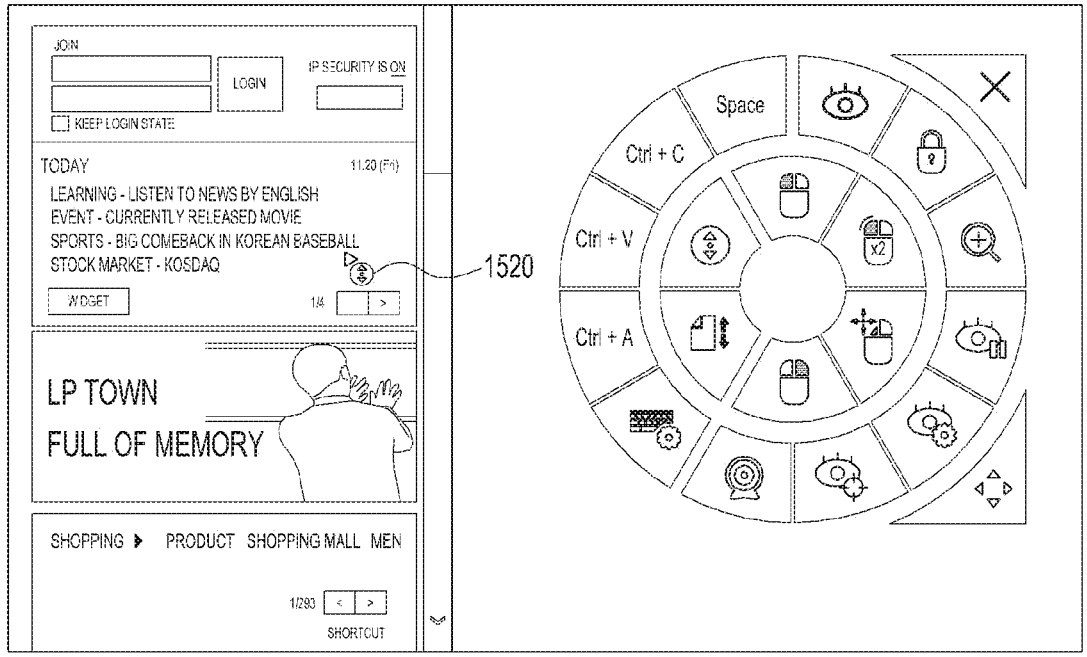
FIG. 15B illustrates an example for moving the point of gaze to a screen to be scrolled in a state where the menu corresponding to the scroll is selected according to an embodiment of the present invention.
Figure 15C:
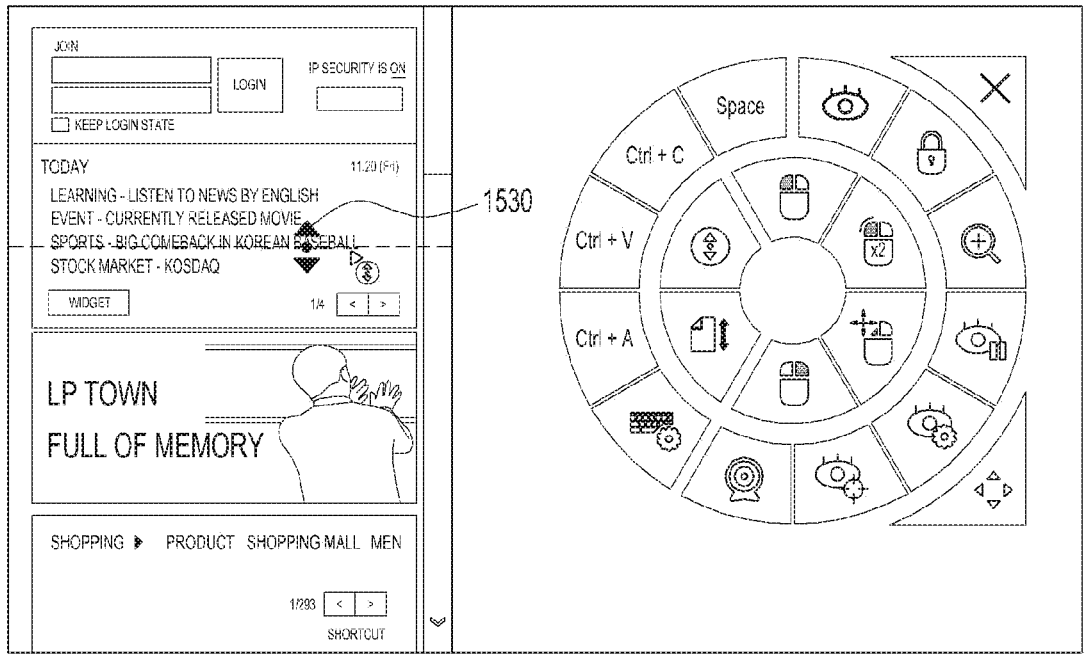
FIG. 15C illustrates an example for generating an input signal in a state where the point of gaze moves to the screen to be scrolled according to an embodiment of the present invention.
Figure 15D:
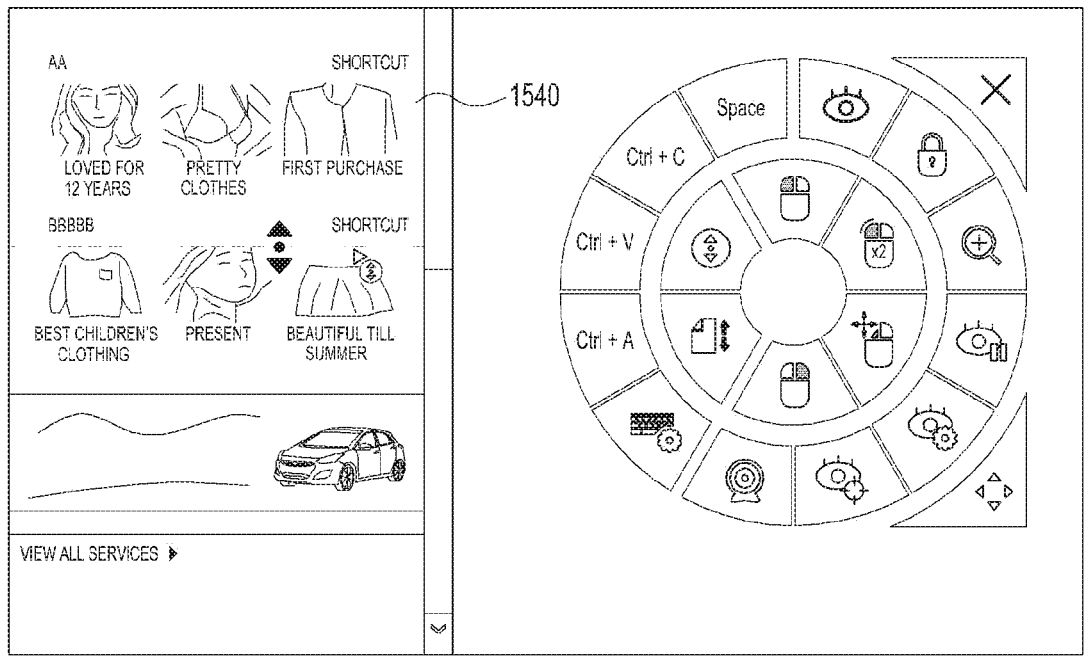
FIG. 15D illustrates an example for applying a scroll function to the Internet screen in response to the generation of the input signal according to an embodiment of the present invention.

FIG. 15A illustrates an example for selecting a menu corresponding to a scroll on the user interface to scroll an Internet screen through the mouse according to an embodiment of the present invention, FIG. 15B illustrates an example for moving the point of gaze to a screen to be scrolled in a state where the menu corresponding to the scroll is selected according to an embodiment of the present invention, FIG. 15C illustrates an example for generating an input signal in a state where the point of gaze moves to the screen to be scrolled according to an embodiment of the present invention, and FIG. 15D illustrates an example for applying a scroll function to the Internet screen in response to the generation of the input signal according to an embodiment of the present invention.

Referring to FIGS. 15A to 15D, when the line of gaze moves to an Internet screen as illustrated in FIG. 15B after the use looks at a menu 1510 corresponding to a scroll on the user interface according to an embodiment of the present invention and an input (for example, a voice or eye blinking) is generated, a pointer 1520 corresponding to the scroll may be generated on the Internet screen according to the point of eye gaze. In such a state, when an input (for example, a voice or eye blinking) is generated again, an icon 1530 corresponding to the scroll function may be activated on the Internet screen and an Internet screen 1540 may be scrolled in a direction which the user's gaze faces as illustrated in FIG. 15D.

The term "module" as used herein may, for example, mean a unit including one of hardware, software, and firmware or a combination of two or more of them. The "module" may be interchangeable with a term, such as a unit, a logic, a logical block, a component, or a circuit. The "module" may be a minimum unit of an integrated component element or a part thereof. The "module" may be a minimum unit for performing one or more functions or a part thereof. The "module" may be mechanically or electronically implemented. For example, the "module" according to the present invention may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present invention may be implemented by a command stored in a computer-readable storage medium in a programming module form. When the command is executed by one or more processors (for example, the processor 213), the one or more processors may execute a function corresponding to the command. The computer-readable storage medium may be, for example, the memory 216. At least some of the programming modules may be implemented (for example, executed) by, for example, the processor. At least some of the programming modules may include, for example, a module, a program, a routine, a set of instructions or a process for performing one or more functions.

The computer readable recoding medium includes magnetic media such include magnetic media, such as a hard disk, a floppy disk and a magnetic tape, optical media, such as a Compact Disc Read Only Memory (CD-ROM) and a Digital Versatile Disc (DVD), magneto-optical media, such as a floptical disk, and a hardware device specially configured to store and execute a program command, such as a Read Only Memory (ROM), a Random Access Memory (RAM) and a flash memory. In addition, the program instructions may include high class language codes, which can be executed in a computer by using an interpreter, as well as machine codes made by a compiler. The aforementioned hardware device may be configured to operate as one or more software modules in order to perform the operation of the present invention, and vice versa.

The programming module according to the present invention may include one or more of the aforementioned components or may further include other additional components, or some of the aforementioned components may be omitted. Operations executed by a module, a programming module, or other component elements according to various embodiments of the present invention may be executed sequentially, in parallel, repeatedly, or in a heuristic manner. Furthermore, some operations may be executed in a different order or may be omitted, or other operations may be added. According to various embodiments, a storage medium having instructions stored therein is provided. The instructions are configured to cause, when being executed by at least one processor, the at least one processor to perform at least one operation. The instructions may include a first instruction set for measuring ambient brightness, a second instruction set for making a light source emit light by controlling at least one of a brightness strength of the light source and an exposure time of the light source in order to capture an image corresponding to the measured ambient brightness, a third instruction set for generating a plurality of frames corresponding to the capturing of the image through the emitted light source, and a fourth instruction set for selecting at least one of the plurality of generated frames. Further, the instructions are configured to cause, when being executed by at least one processor, the at least one processor to perform at least one operation. The instructions may include a first instruction set for tracking the point of eye gaze, a second instruction set for displaying a user interface for controlling a screen based on the tracked point of gaze on the screen, and a third instruction set for executing a selected function according to selection of a predetermined menu of the user interface based on the tracked point of gaze.

Exemplary embodiments of the present invention shown and described in this specification and the drawings correspond to specific examples presented in order to easily describe technical contents of the present invention and to help comprehension of the present invention, and are not intended to limit the scope of the present invention. Therefore, it should be construed that, in addition to the embodiments disclosed herein, all modifications and changes or modified and changed forms derived from the technical idea of the present invention fall within the scope of the present invention.

The invention claimed is:

1. A method of capturing an image by an electronic device, the method comprising:
   measuring ambient brightness;
   emitting a light source by controlling a brightness strength of the light source and an exposure time of the light source to capture an image based on the measured ambient brightness;
   generating a plurality of frames by capturing the image based on the emitted light source; and
   selecting at least one frame from among the generated plurality of frames, wherein the at least one frame is selected based on signal to noise ratios (SNRs) of the generated plurality of frames and brightnesses of the generated plurality of frames.

2. The method of claim 1, wherein the emitted light source is synchronized with at least one of a vertical synchronization signal or a horizontal synchronization signal.

3. The method of claim 2, wherein the emitting of the light source comprises synchronizing the brightness strength of the light source and the exposure time of the light source with timing of at least one of the vertical synchronization signal or the horizontal synchronization signal.

4. The method of claim 2, wherein the emitting of the light source comprises emitting a first light source and a second light source alternately based on an active interval of the vertical synchronization signal.

5. The method of claim 2, wherein the generated plurality of frames correspond to frames generated in a unit of predetermined time in an active interval of the vertical synchronization signal.

6. The method of claim 1, wherein the controlling comprises controlling the brightness strength of the light source to be brighter than the ambient brightness.

7. The method of claim 1, further comprising tracking a point of a user eye gaze based on the selected at least one frame.

8. The method of claim 1, further comprising:
identifying a point of a user eye gaze based on the selected at least one frame;
displaying, on a display unit of the electronic device, a user interface for controlling a screen of the display unit based on the identified point of the user eye gaze; and
executing a function according to a predetermined menu on the user interface selected based on the identified point of the user eye gaze.

9. The method of claim 8, wherein the executing of the function comprises:
determining whether a cursor displayed according to the identified point of the user eye gaze is located on the predetermined menu of the user interface;
detecting an input for selecting the predetermined menu; and
executing the function of the predetermined menu at a position where the point of the user eye gaze is located on the screen.

10. The method of claim 9, wherein the input for selecting the predetermined menu includes at least one of cases where a voice is input, eye blinking is made, and the identified point of gaze stays on the predetermined menu for a time longer than a predetermined time.

11. The method of claim 8, wherein a location of the user interface can be changed on the screen and is in a circular type or a rectangular type.

12. The method of claim 8, wherein the user interface includes a first group having a menu corresponding to at least one function provided by a mouse and a second group having a menu corresponding to at least one function for controlling the display unit based on the identified point of the user eye gaze.

13. The method of claim 12, wherein the first group includes at least one of a menu corresponding to a left click of the mouse, a menu corresponding to a right click of the mouse, a menu corresponding to a left double click of the mouse, a menu corresponding to a drag using the mouse, a menu corresponding to a scroll using the mouse, or a menu corresponding to page switching using the mouse.

14. The method of claim 12, wherein the second group includes at least one of a menu for activating the user interface, a menu for deactivating the user interface, a menu for setting the user interface, a menu for enlarging an area where a cursor of the mouse is located, a menu for switching between an eye mouse using the point of eye gaze and a normal mouse, a menu for setting a function of the eye mouse, a menu for setting location information of the eye, a menu for a camera view, a menu for setting a short-cut key, a menu for selecting data displayed on the screen, a menu for copying the selected data, a menu for pasting the copied data, or a menu corresponding to a space bar of a keyboard.

15. An electronic device for capturing an image, the electronic device comprising:
a light emitting unit comprising at least one light emitting element for emitting a light source;
a camera unit configured to capture an image based on the emitted light source;
a detection unit configured to measure ambient brightness to capture the image; and
a controller configured to:
emit the light source by controlling a brightness strength of the light source and exposure time of the light source to capture the image based on the measured ambient brightness,
generate a plurality of frames by capturing the image based on the emitted light source, and
select at least one frame from among the generated plurality of frames, wherein the at least least one frame is selected based on signal to noise ratios (SNRs) of the generated plurality of frames and brightnesses of the generated plurality of frames.

16. The electronic device of claim 15, wherein the controller is further configured to synchronize the light source with at least one of a vertical synchronization signal or a horizontal synchronization signal.

17. The electronic device of claim 16, wherein the controller is further configured to generate the plurality of frames in a unit of predetermined time in an active interval of the vertical synchronization signal.

18. The electronic device of claim 15, wherein the controller is further configured to control the brightness of the light source to be brighter than the ambient brightness.

19. The electronic device of claim 15, wherein the controller is further configured to track a point of a user eye gaze based the selected at least one frame.

20. The electronic device of claim 15, wherein the controller is further configured to control the brightness strength of the light source by using a number of light emitting elements, brightness of the light emitting elements, and an amount of current converted from the brightness of the light emitting elements.

* * * * *